US012512043B2

(12) United States Patent
Han

(10) Patent No.: US 12,512,043 B2
(45) Date of Patent: Dec. 30, 2025

(54) LIGHT EMITTING DISPLAY APPARATUS

(71) Applicant: LG Display Co., Ltd., Seoul (KR)

(72) Inventor: JunHee Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/770,073

(22) Filed: Jul. 11, 2024

(65) Prior Publication Data

US 2025/0118246 A1 Apr. 10, 2025

(30) Foreign Application Priority Data

Oct. 5, 2023 (KR) ........................ 10-2023-0132530

(51) Int. Cl.

*G09G 5/02* (2006.01)
*G09G 3/32* (2016.01)
*G09G 3/3266* (2016.01)
*G09G 3/3291* (2016.01)
*G09G 5/00* (2006.01)

(52) U.S. Cl.

CPC ............. *G09G 3/32* (2013.01); *G09G 3/3266* (2013.01); *G09G 3/3291* (2013.01); *G09G 2300/0426* (2013.01); *G09G 2310/0267* (2013.01); *G09G 2310/0275* (2013.01)

(58) Field of Classification Search

CPC ................................................ G02F 1/133514
See application file for complete search history.

(56) References Cited

U.S. PATENT DOCUMENTS

| | | | | |
|---|---|---|---|---|
| 10,943,954 | B2 | 3/2021 | Park et al. | |
| 11,882,746 | B2 | 1/2024 | Park et al. | |
| 2002/0175634 | A1* | 11/2002 | Ishizuka | G09G 3/3275 315/169.1 |
| 2004/0222952 | A1* | 11/2004 | Huang | G06F 3/03542 345/82 |
| 2005/0040758 | A1* | 2/2005 | Wolk | H10K 71/18 313/506 |
| 2012/0013825 | A1* | 1/2012 | Sugiura | G02F 1/1323 349/76 |
| 2012/0050309 | A1* | 3/2012 | Tsuchida | G09G 5/377 345/592 |
| 2017/0092166 | A1* | 3/2017 | Choi | H10K 59/80521 |
| 2020/0006443 | A1 | 1/2020 | Park et al. | |
| 2020/0105855 | A1* | 4/2020 | Lee | H10K 50/82 |
| 2021/0151518 | A1 | 5/2021 | Park et al. | |

FOREIGN PATENT DOCUMENTS

| | | |
|---|---|---|
| KR | 10-2020-0001414 A | 1/2020 |
| KR | 10-2020-0058891 A | 5/2020 |

* cited by examiner

*Primary Examiner* — Nan-Ying Yang
(74) *Attorney, Agent, or Firm* — Fenwick & West LLP

(57) ABSTRACT

A light emitting display apparatus is disclosed in which some of pixels outputting light can transmit external light, and the light emitting display apparatus comprises a substrate divided into a transmission area through which light is transmitted and a non-transmission area through which light is blocked, a first color pixel in the non-transmission area and including a first pixel driving circuit and a first light emitting device, a second color pixel in the non-transmission area and including a second pixel driving circuit and a second light emitting device, and a transparent pixel in the transmission area and including a transparent light emitting device.

26 Claims, 8 Drawing Sheets

LIGHT EMITTING DISPLAY APPARATUS

CROSS-REFERENCE TO RELATED APPLICATION

This application claims the benefit of the Republic of Korea Patent Application No. 10-2023-0132530 filed on Oct. 5, 2023, which is hereby incorporated by reference in its entirety.

BACKGROUND

Field of Technology

The present disclosure relates to a light emitting display apparatus.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images.

In order to provide various functions, a transparent light emitting display apparatus has recently been used.

In order to display an image, pixels should be provided in a transparent light emitting display apparatus.

In this case, it is difficult for light to transmit through the pixels. Therefore, improvement of transparency of the light emitting display apparatus is limited due to the area of the pixels.

The above-described background is part of the present disclosure to devise the present disclosure or is technical information acquired by a process of devising the present disclosure, but may not be regarded as the known art disclosed to the general public before the present disclosure is disclosed.

SUMMARY

Accordingly, the present disclosure is directed to providing a light emitting display apparatus that substantially obviates one or more problems due to limitations and disadvantages of the related art.

An aspect of the present disclosure is directed to providing a light emitting display apparatus in which some of pixels outputting light can transmit external light through the pixels.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus comprising: a substrate divided into a transmission area through which light is transmitted and a non-transmission area through which light is blocked; a first color pixel in the non-transmission area, the first color pixel including a first pixel driving circuit and a first light emitting device that is electrically connected to the first pixel driving circuit; a second color pixel in the non-transmission area, the second color pixel include a second pixel driving circuit and a second light emitting device that is electrically connected to the second pixel driving circuit; and a transparent pixel in the transmission area, the transparent pixel including a transparent light emitting device that emits light without being electrically connected to a pixel driving circuit.

In one embodiment, a display device comprises: a substrate including a transmission area and a non-transmission area that is less transmissive of external light than the transmission area; a first pixel in the non-transmission area that is configured to emit light, the first pixel including a first light emitting device and a first transistor that is electrically connected to the first light emitting device; and a second pixel in the transmission area that is configured to emit light, the second pixel including a transparent light emitting device that is directly connected to an anode line that supplies an anode voltage corresponding to image data of the second pixel to the transparent light emitting device.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
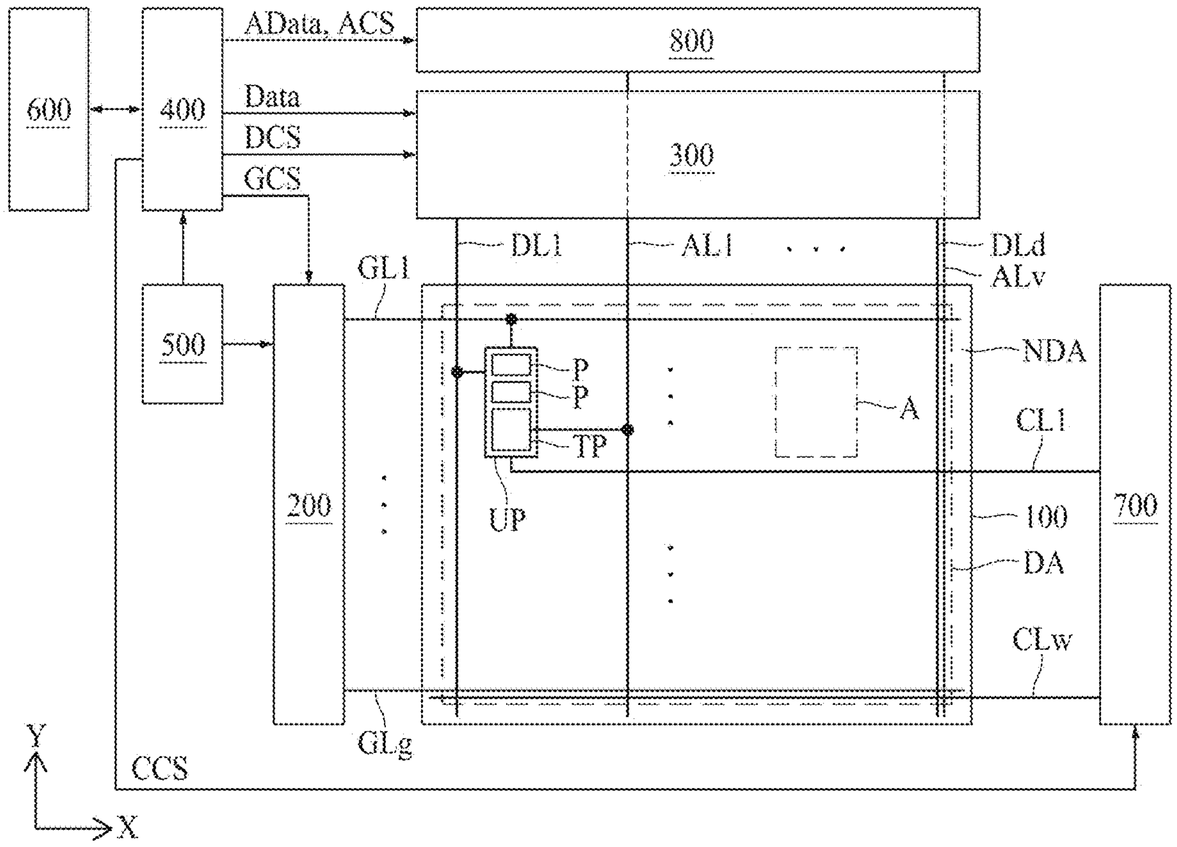
FIG. 1 is an exemplary diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
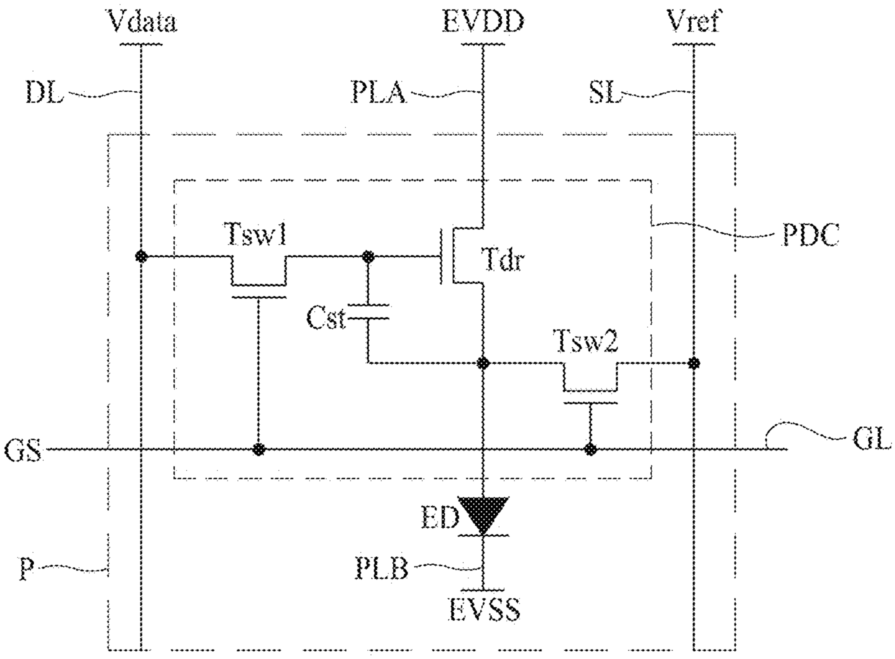
FIG. 2 is an exemplary diagram illustrating a structure of a pixel applied to a light emitting display apparatus according to an embodiment of the present disclosure.
Figure 3:
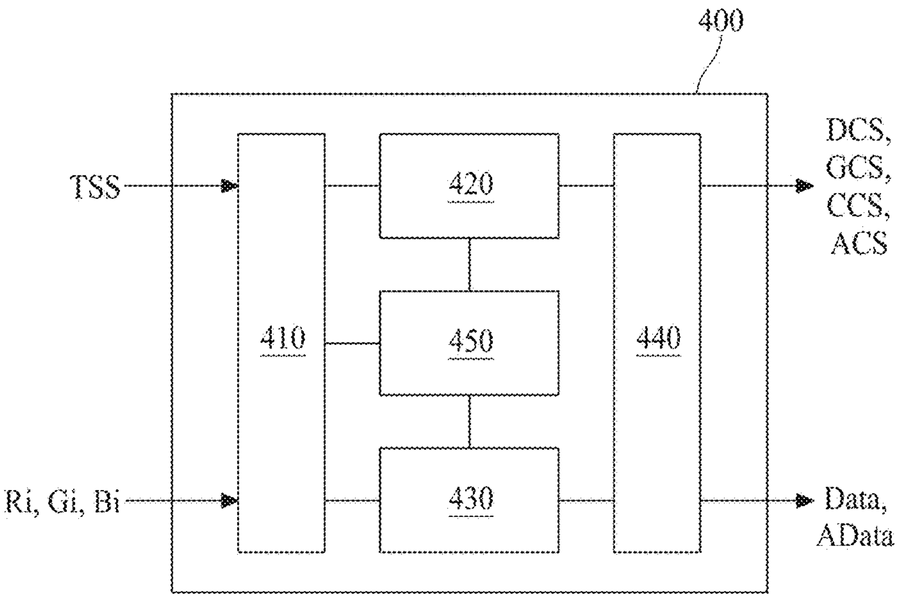
FIG. 3 is an exemplary diagram illustrating a structure of a control driver applied to a light emitting display apparatus according to an embodiment of the present disclosure.
Figure 4:
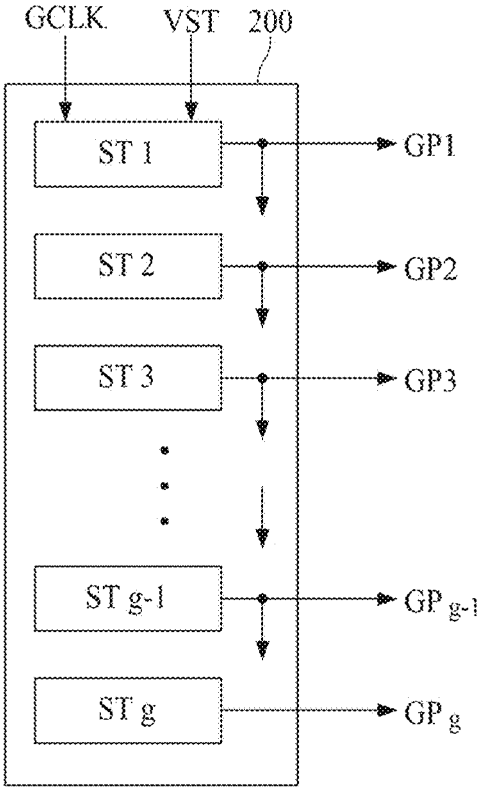
FIG. 4 is an exemplary diagram illustrating a structure of a gate driver applied to a light emitting display apparatus according to an embodiment of the present disclosure.
Figure 5:
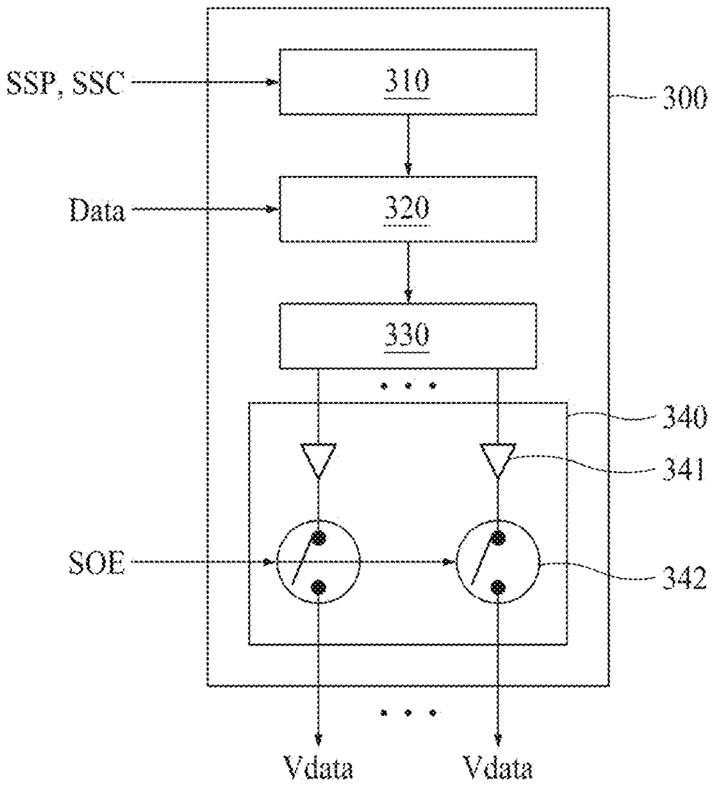
FIG. 5 is an exemplary diagram illustrating a structure of a data driver applied to a light emitting display apparatus according to an embodiment of the present disclosure.

FIG. 1 is an exemplary diagram illustrating a configuration of a light emitting display apparatus according to an embodiment of the present disclosure, FIG. 2 is an exemplary diagram illustrating a structure of a pixel applied to a light emitting display apparatus according to an embodiment of the present disclosure, FIG. 3 is an exemplary diagram illustrating a structure of a control driver applied to a light emitting display apparatus according to an embodiment of the present disclosure, FIG. 4 is an exemplary diagram illustrating a structure of a gate driver applied to a light emitting display apparatus according to an embodiment of the present disclosure, and FIG. 5 is an exemplary diagram illustrating a structure of a data driver applied to a light emitting display apparatus according to an embodiment of the present disclosure.

A light emitting display apparatus according to an embodiment of the present disclosure can be used as various kinds of electronic devices. Electronic devices can be, for example, televisions, monitors, etc.

The light emitting display apparatus according to an embodiment of the present disclosure, as illustrated in FIG. 1, can include a light emitting display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, an anode driver 800 which supplies anode voltages to a plurality of anode lines AL1 to ALv, a cathode driver 700 which supplies cathode voltages to a plurality of cathode lines CL1 to CLw, a control driver 400 which controls driving of the gate driver 200, the data driver 300, the anode driver 800, and the cathode driver 700, and a power supply unit 500 which supplies power to the control driver 400, the gate driver 200, the data driver 300, the anode driver 800, the cathode driver 700, and the light emitting display panel 100.

First, the light emitting display panel 100 can include a display area DA and a non-display area NDA. Gate lines GL1 to GLg, data lines DL1 to DLd, anode lines AL1 to ALv, cathode lines CL1 to CLw, transparent pixels TP, and pixels P can be provided in the display area DA. Accordingly, an image can be displayed in the display area DA.

Here, g, d, v and w are natural numbers. The non-display area NDA can surround the outer periphery of the display area DA.

The pixel P included in the light emitting display panel 100, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility, or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the reference voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The sensing control line can be provided independently of the gate line GL, but the gate line GL can also be used as the sensing control line.

Hereinafter, a pixel driving circuit in which the gate line GL is connected to a gate of the switching transistor Tsw1 and a gate of the sensing transistor Tsw2, as illustrated in FIG. 2 will be described as an example of the pixel driving circuit PDC applied to a light emitting display apparatus according to a present disclosure.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode.

The structure of the pixel P applied to the present disclosure is not limited to the structure illustrated in FIG. 2. Accordingly, the structure of the pixel P can be changed to various shapes.

Unit pixel UP including at least two pixels P and one transparent pixel TP can be provided in the display area DA. White light can be emitted through the unit pixel UP. Hereinafter, for convenience of description, a light emitting display apparatus according to an embodiment of the present disclosure will be described using a unit pixel UP including two pixels P and one transparent pixel TP as an example.

For example, the two pixels P configuring the unit pixel UP can be a red pixel and a blue pixel, and the transparent pixel TP configuring the unit pixel UP can be a green pixel. The red pixel can output red light, the blue pixel can output blue light, and the green pixel can output green light.

Hereinafter, for convenience of description, the red pixel (or the blue pixel) is referred to as a first color pixel, the blue pixel (or the red pixel) is referred to as a second color pixel, and the green pixel is referred to as a transparent pixel TP.

In this case, each of the first color pixel and the second color pixel can be referred to by reference numeral P. That is, each of the first color pixel P and the second color pixel P can be a pixel P having the structure described with reference to FIG. 2.

The first color pixel P and the second color pixel P are opaque pixels which do not transmit light, and the transparent pixel TP can transmit light.

As described above, the transparent pixel TP can be a green pixel, but the light emitting display apparatus according to the present disclosure is not limited thereto. Accordingly, the transparent pixel TP can be any one of pixels which output light of various colors in addition to the green pixel.

For example, a pixel outputting light of a color which does not have a significant influence on the generation of white light can be used as the transparent pixel TP.

The transparent pixel TP includes only the light emitting device ED among the elements illustrated in FIG. 2. Accordingly, the transparent pixel TP does not include a pixel driving circuit PDC as illustrated in FIG. 2.

The light emitting device ED provided in the transparent pixel TP can include a transparent anode formed of a transparent metal and a transparent cathode formed of a transparent metal.

The transparent anode can be connected to an anode line AL, and the transparent cathode can be connected to a cathode line CL.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 which realigns input image data Ri, Gi, and Bi to generate image data Data corresponding to the first color pixel P and the second color pixel and anode data corresponding to the transparent pixel TP, a control signal generator 420 which generates the gate control signal GCS and the data control signal DCS by using the timing synchronization signal TSS, an input unit 410 which transmits the timing synchronization signal TSS transmitted from the external system 600 to the control signal generator 420 and transmits the input image data Ri, Gi, and Bi transmitted from the external system 600 to the data aligner 430, and an output unit 440 which supplies the data driver 300 with the image data Data generated by the data aligner 430 and the data control signal DCS generated by the control signal generator 420, supplies the gate driver 200 with the gate control signal GCS generated by the control signal generator 420, and supplies the anode driver 800 with anode data AData generated by the data aligner 430 and an anode control signal ACS generated by the control signal generator 420.

The control signal generator 420 can generate a power control signal supplied to the power supply unit 500.

The control signal generator 420 can generate a cathode control signal CCS capable of controlling the cathode driver 700 to transmit it to the output unit 440, and the output unit 440 can transmit the cathode control signal CCS to the cathode driver 700.

The control signal generator 420 can generate an anode control signal ACS capable of controlling the anode driver 800 to transmit the anode control signal ACS to the output unit 440, and the output unit 440 can transmit the anode control signal ACS to the anode driver 800.

The control driver 400 can further include a storage unit for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information, image information, and letter information over a communication network and can transmit the received image information to the control driver 400. For example, the external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, the cathode driver 700, the anode driver 800, and the light emitting display panel 100.

The gate driver 200 can be directly embedded into the non-display area NDA by using a gate-in panel (GIP) type, or the gate driver 200 can be provided in the display area DA in which light emitting devices ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the light emitting display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

The cathode driver 700 can be configured in a similar structure to the gate driver 200.

For example, the cathode driver 700 can be directly embedded into the non-display area NDA, or can be provided in the display area DA in which light emitting devices ED are provided, or, can be provided on a chip on film mounted in the non-display area NDA.

When the cathode driver 700 is directly embedded in the non-display area NDA, the cathode driver 700 can be provided in a non-display area NDA facing a non-display area NDA provided with the gate driver 200, or can be provided in a non-display area NDA where the gate driver 200 is provided.

The cathode driver 700 can supply cathode voltages to the cathode lines CL1 to CLw.

When the cathode voltage generated in the cathode driver 700 is supplied to the transparent cathode provided in the transparent pixel TP and the anode voltage generated in the anode driver 800 is supplied to the transparent anode provided in the transparent pixel TP, light can be output from the transparent pixel TP.

In order to supply cathode voltages to the cathode lines CL1 to CLw, the cathode driver 700 can be configured in a similar structure to the gate driver 200 illustrated in FIG. 4.

For example, the cathode driver 700 can include cathode stages capable of sequentially outputting the cathode voltage.

Each of the cathode stages can be connected to one cathode line CL, but can also be connected to at least two cathode lines CL.

In order to generate cathode voltages, a cathode start signal and at least one cathode clock which are generated by the control signal generator 420 can be transmitted to the cathode driver 700. That is, the cathode start signal VST and at least one cathode clock can be included in the cathode control signal CCS.

Any one of the cathode stages can be driven by a cathode start signal to output a cathode voltage to the cathode line CL. The cathode voltage can be generated by a cathode clock.

At least one of signals output from a cathode stage where the cathode voltage is output can be supplied to another cathode stage to drive another cathode stage. Accordingly, a cathode voltage can be output from another cathode stage.

That is, the cathode stages can be driven sequentially to sequentially supply cathode voltages to the cathode lines CL.

However, the cathode driver 700 can include the power supply unit 500 and a power control unit which can generate a power control signal capable of controlling the power supply unit 500.

For example, when the cathode voltage generator which is provided in the power supply unit 500 and generates a cathode voltage is connected to the cathode lines CL through cathode switches, the power control unit can sequentially turn on the cathode switches, and the cathode voltage can be supplied to a cathode line CL connected to the turned-on cathode switch.

In this case, the power control unit can have a structure similar to the gate driver 200 illustrated in FIG. 4, or can have one of various structures capable of outputting power control signals which can sequentially turn on the cathode switches.

Finally, the anode driver 800 can simultaneously output anode voltages to the anode lines AL1 to ALv.

In this case, the anode voltages simultaneously supplied to the anode lines AL1 to ALv can have different levels or the same level.

When the anode voltages simultaneously supplied to the anode lines AL1 to ALv have different levels, the anode driver 800 has the same or similar structure to the structure of the data driver 300 described with reference to FIG. 5.

For example, when a first anode voltage supplied to a first anode line AL1 is supplied to one transparent pixel TP, the control driver 400 can generate a first anode data AData by using input image data corresponding to a transparent pixel TP to which the first anode voltage is supplied. The anode driver 800 can generate the first anode voltage by using the first anode data AData, and then supply the first anode voltage to the first anode line AL1.

This operation can be equally performed for a second anode line to a vth anode line ALv.

Accordingly, the anode voltages simultaneously supplied to the anode lines AL1 to ALv can have different levels. Therefore, light with different luminance can be output from transparent pixels TP which emit light at the same time.

As another example, when the first anode voltage supplied to the first anode line AL1 is supplied to at least two transparent pixels TP, the control driver 400 can generate the first anode data AData by using input image data corresponding to transparent pixels TP to which the first anode voltage is supplied.

For example, the control driver 400 can generate the first anode data AData by using the average value of input image data corresponding to the transparent pixels TP to which the first anode voltage is to be supplied.

The anode driver 800 can generate an anode voltage by using the first anode data AData and then supply the first anode voltage to the first anode line AL1.

This operation can be equally performed for the second anode line to a vth anode lines ALv.

Accordingly, the anode voltages simultaneously supplied to the anode lines AL1 to ALv can have different levels.

In this case, light with the same luminance can be output from the transparent pixels TP to which the first anode voltage is supplied through the first anode line AL1, and the luminance of light output from the transparent pixels TP connected to the first anode line AL1 and the luminance of light output from the transparent pixels TP connected to the vth anode line ALv can be different.

When the anode voltages simultaneously supplied to the anode lines AL1 to ALv have the same level, the anode driver 800 can simultaneously supply the same anode voltages to the anode lines AL1 to ALv depending on the anode control signal ACS transmitted from the control driver 400.

In this case, after the first anode voltage is simultaneously supplied to the anode lines AL1 to ALv, when the second anode voltage is simultaneously supplied to the anode lines AL1 to ALv, the second anode voltage can have the same level as the first anode voltage, or have a different level from the first anode voltage.

For example, the control driver 400 can transmit only the anode control signal ACS related to the timing at which the anode voltages will be output, to the anode driver 800. The anode driver 800 can supply a predetermined first anode voltage to the anode lines AL1 to ALv depending on the anode control signal ACS.

In this case, the anode driver 800 can include anode switches. The anode switches can be provided in the power supply unit 500, and particularly can be provided between an anode voltage generator generating the first anode voltage and the anode lines AL1 to ALv.

The anode switches can be simultaneously turned on depending on the anode control signal ACS, so that the first anode voltage transmitted from the anode voltage generator can be supplied to the anode lines AL1 to ALv.

Accordingly, light having luminance corresponding to the first anode voltage can be output from the transparent pixels TP which emit light simultaneously.

After the first anode voltage is supplied simultaneously, when the second anode voltage is simultaneously supplied to the anode lines AL1 to ALv, the second anode voltage can have the same level as the first anode voltage.

Accordingly, light having luminance corresponding to the first anode voltage can be output from the transparent pixels TP which simultaneously emit light by the second anode voltage.

In this case, the first anode voltage can be set through various tests and simulations in the manufacturing process of the light emitting display apparatus. For example, in a light emitting display apparatus, only the first anode voltage set in the manufacturing process of the light emitting display apparatus can be used.

However, the first anode voltage can be set in the control driver 400 for each frame period. A frame period can mean the period during which one image is displayed. Therefore, in the following description, a first frame period can mean a period during which a first image is displayed, and a second frame period can mean a period during which a second image is displayed.

Further, in the following description, one frame period means the actual length of each frame period. For example, one frame period can be 1 ms (millisecond), 1 us (microsecond), Ins (nanosecond), etc.

To provide an additional description, the control driver 400 can analyze input image data corresponding to a first frame period to set a first anode voltage to be supplied to the anode lines AL1 to ALv in the first frame period. Also, the control driver 400 can analyze input image data corresponding to a second frame period to set the second anode voltage to be supplied to the anode lines AL1 to ALv in the second frame period. Further, the control driver 400 can analyze input image data corresponding to a kth frame period (k is a natural number) to set a kth anode voltage to be supplied to the anode lines AL1 to ALv in the kth frame period.

For example, the control driver 400 can transmit first anode data AData corresponding to the first anode voltage set in the first frame period to the anode driver 800. The anode driver 800 can generate a first anode voltage by using the first anode data AData and continuously supply the first anode voltage to the anode lines AL1 to ALv during the first frame period.

In this case, during the first frame period, the first anode voltage can be supplied to the anode lines AL1 to ALv at least twice.

The control driver 400 can transmit second anode data AData corresponding to the second anode voltage set in the second frame period to the anode driver 800. The anode driver 800 can generate a second anode voltage by using the second anode data (Data and continuously supply the second anode voltage to the anode lines AL1 to ALv during the second frame period.

In this case, during the second frame period, the second anode voltage can be supplied to the anode lines AL1 to ALv at least twice.

In this case, the anode driver 800 can have a structure similar to that of the data driver 300 illustrated in FIG. 5. However, because the same anode voltage is supplied to all anode lines AL1 to ALv, the anode driver 800 can include only one buffer 341 and one switch 342.

After the first anode voltage is supplied simultaneously, when the second anode voltage is simultaneously supplied to the anode lines AL1 to ALv, the second anode voltage can have a level different from the first anode voltage.

In this case, for example, the control driver 400 can set the first anode voltage by using the average value of input image data corresponding to transparent pixels TP to which the first anode voltage is to be supplied, and can set the second anode voltage by using the average value of input image data corresponding to transparent pixels TP to which the second anode voltage is to be supplied.

For example, the control driver 400 can set the first anode voltage and the second anode voltage which are output to the anode lines AL1 to ALv during the first frame period and have different levels. The control driver 400 can generate first anode data AData corresponding to the first anode voltage and second anode data AData corresponding to the second anode voltage to transmit them to the anode driver 800.

The anode driver 800 can generate a first anode voltage by using a first anode data AData, and supply the first anode voltage to the anode lines AL1 to ALv during a portion of the first frame period. Further, after the first anode voltage is supplied, the anode driver 800 can generate a second anode voltage by using a second anode data AData, and supply the second anode voltage to the anode lines AL1 to ALv during another portion of the first frame period.

In this case, the anode driver 800 can have a structure similar to that of the data driver 300 illustrated in FIG. 5. However, because the same anode voltage is supplied to all anode lines AL1 to ALv, the anode driver 800 can include only one buffer 341 and one switch 342.

As described above, the anode driver 800 can generate anode voltages and simultaneously supply the anode voltages to the anode lines AL1 to ALv. In this case, the anode voltages supplied to the anode lines AL1 to ALv can be the same or different. Moreover, when the second anode voltages are supplied after the first anode voltages are supplied to the anode lines AL1 to ALv, the second anode voltages can be the same as or different from the first anode voltages.

Hereinafter, the specific structure of the light emitting display panel 100 will be described with reference to FIGS. 6 to 8.

Figure 6:
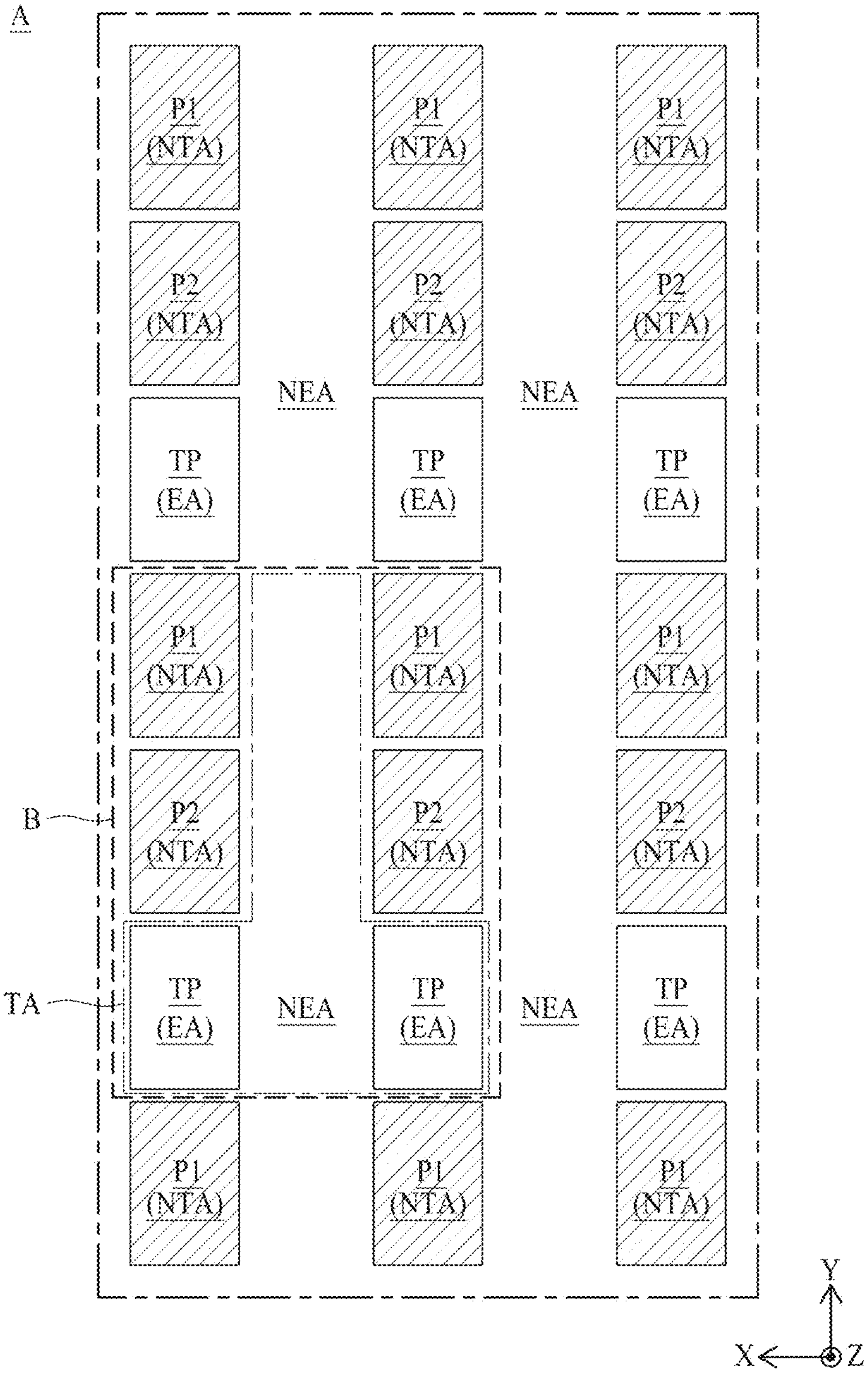
FIG. 6 is a plan view illustrating pixels arranged in an area A of FIG. 1 according to an embodiment of the present disclosure.

FIG. 6 is a plan view illustrating pixels arranged in an area A of FIG. 1. In the following description, details which are the same as or similar to details described with reference to FIGS. 1 to 5 are omitted or will be briefly described.

A light emitting display panel applied to a light emitting display apparatus according to an embodiment of the present disclosure can include a transmission area TA through which light is transmitted and a non-transmission area NTA through which light is blocked.

For example, the display area DA of the light emitting display panel 100 can include a transmission area TA (or referred to as a transparent area) and a non-transmission area NTA.

The transmission area TA can be an area which allows most of light incident from the outside the display device to pass through the transmission area TA. In one embodiment, the non-transmission area NTA is less transmissive of external light than the transmission area TA.

Particularly, in the light emitting display apparatus according to the present disclosure, the transmission area TA can include a light emitting area EA provided with the transparent pixel TP and a non-light emitting area NEA in which light emitting devices are not provided, as illustrated in FIG. 6. That is, the non-light emitting area NEA lacks any light emitting devices.

For example, the transparent pixel TP can be provided with a light emitting device ED including a transparent anode and a transparent cathode. Accordingly, light can be output from the transparent pixel TP, and thus, the transparent pixel TP can become the light emitting area EA. Further, because light can be transmitted through the transparent anode and transparent cathode in the transparent pixel TP, the transparent pixel TP can become the transmission area TA.

To provide an additional description, because the transparent pixel TP is not provided with a pixel driving circuit PDC formed of materials which can block light, but is provided with the transparent anode and the transparent cathode, light can be transmitted in the transparent pixel TP.

Moreover, because the non-light emitting area NEA is not provided with light emitting device ED, the non-light emitting area NEA is not provided with metal which can block light. Therefore, because light can be transmitted in the non-light emitting area NEA, the non-light emitting area NEA can become the transmission area TA.

The non-transmission area NTA can be an area which does not transmit most of light incident from the outside. Further, the non-transmission area NTA can mean an area where the first color pixels P1 and the second color pixels P2 are provided. As described above, the first color pixel P1, the second color pixel P2, and the transparent pixel TP illustrated in FIG. 6 can configure the unit pixel UP.

That is, the first color pixel P1 and the second color pixel P2 can be the light emitting area EA capable of outputting light, and can be the non-transmission area NTA which does not transmit light.

To provide an additional description, the pixel P can be provided with the light emitting device ED and the pixel driving circuit PDC, as described with reference to FIG. 2. In this case, the pixel driving circuit PDC can overlap the light emitting device ED, and transistors configuring the pixel driving circuit PDC can include opaque electrodes. Accordingly, the pixel P can become the non-transmission area NTA.

For example, each of the first color pixel P1 and the second color pixel P2 illustrated in FIG. 6 can be an anode configuring the pixel P, and the transparent pixel illustrated in FIG. 6 can be a transparent anode configuring the transparent pixel TP. In this case, the non-light emitting area NEA is not provided with an anode and a transparent anode.

Therefore, light cannot be transmitted through the anode of the first color pixel P1 and the anode of the second color pixel P2, but light can be transmitted through the transparent anode of the transparent pixel TP and light can be transmitted through the non-light emitting area NEA.

Accordingly, the first color pixel P1 and the second color pixel P2 can become the non-transmission area NTA, and the transparent pixel TP and the non-light emitting area NEA can become the transmission area TA.

Figure 7:
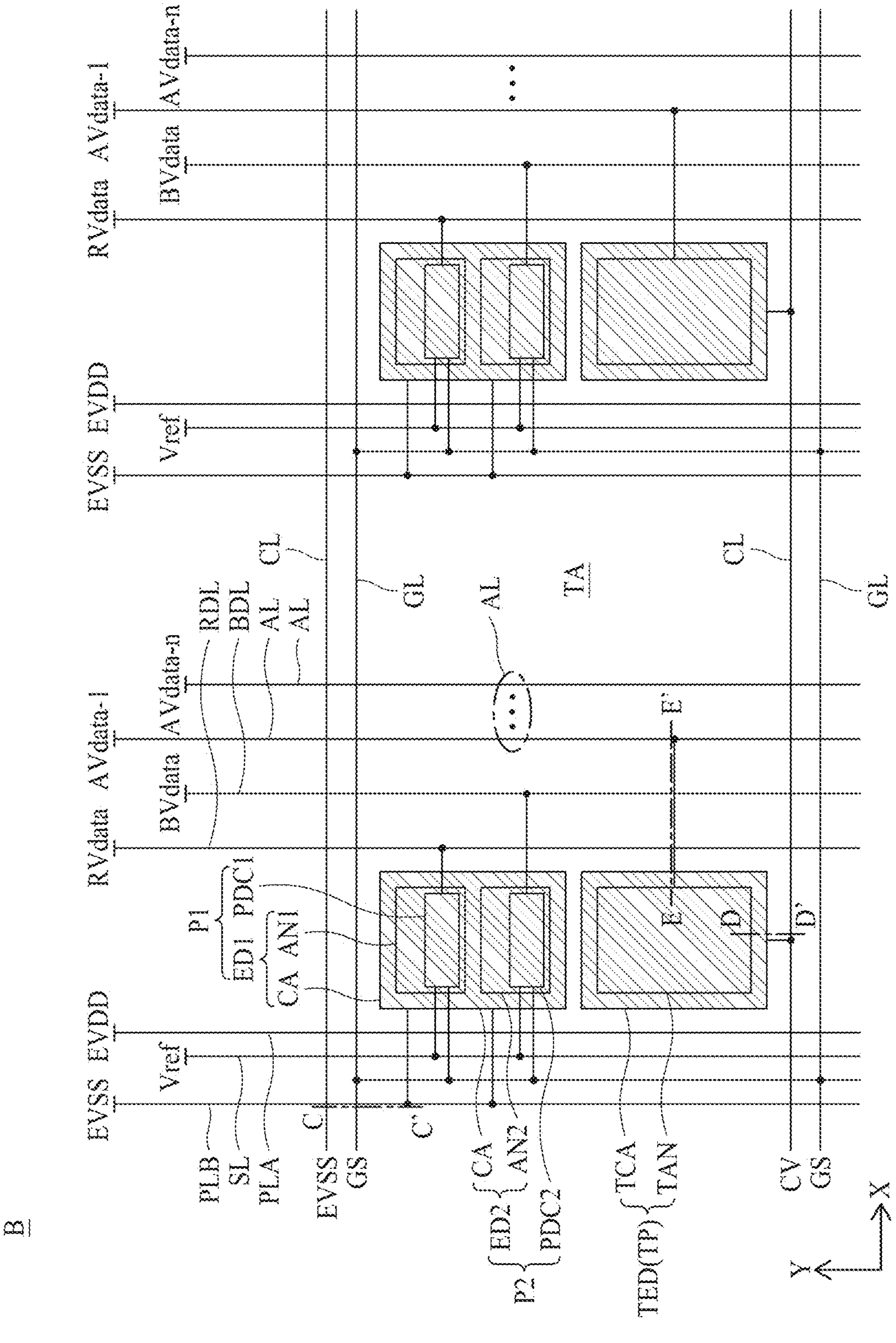
FIG. 7 is a plan view illustrating an area B illustrated in FIG. 6 according to an embodiment of the present disclosure.

FIG. 7 is a plan view illustrating an area B illustrated in FIG. 6 according to one embodiment.

First, as described above, in the light emitting display apparatus according to the present disclosure, the unit pixel UP can include two pixels P and one transparent pixel TP.

In this case, the two pixels P can be the first color pixel P1 and the second color pixel P2.

The first color pixel P1 can include a first pixel driving circuit PDC1 and a first light emitting device ED1 that is electrically connected to the first pixel driving circuit PDC1, and the second color pixel P2 can include a second pixel driving circuit PDC2 and a second light emitting device ED2 that is electrically connected to the second pixel driving circuit PDC2. In the following description, when it is not required to differentiate the first color pixel P1 and the second color pixel P2, each of the first color pixel P1 and the second color pixel P2 can be referred to as a pixel P. Further, when it is not required to differentiate the first light emitting device ED1 and the second light emitting device ED2, each of the first light emitting device ED1 and the second light emitting device ED2 can be referred to as a light emitting device ED.

For example, each of the first pixel driving circuit PDC1 and the second pixel driving circuit PDC2 can have the same structure as the pixel driving circuit PDC illustrated in FIG. 2.

For example, each of the first light emitting device ED1 and the second light emitting device ED2 can have the same structure as the light emitting device ED described with reference to FIG. 2.

The first light emitting device ED1 can include a first anode AN1, a common cathode CA, and a first light emitting layer provided between the first anode AN1 and the common cathode CA.

The second light emitting device ED2 can include a second anode AN2, a common cathode CA, and a second light emitting layer provided between the second anode AN2 and the common cathode CA.

The common cathode CA can be commonly provided in the first color pixel P1 and the second color pixel P2. For example, the common cathode CA can configure the first light emitting device ED1 and also configure the second light emitting device ED2.

In the following description, when the first anode AN1 and the second anode AN2 do not need to be distinguished, each of the first anode AN1 and the second anode AN2 can be referred to as an anode AN.

As described with reference to FIG. 6, each of the first color pixel P1 and the second color pixel P2 can be the non-transmission area NTA.

The transparent pixel TP can include a transparent light emitting device TED without being electrically connected to a pixel driving circuit and can be the transparent area TA.

The transparent light emitting device TED can have the same structure as the first light emitting device ED1 and the second light emitting device ED2.

In this case, each of the first light emitting device ED1 and the second light emitting device ED2 includes an anode and a cathode, one of the anode and the cathode can be an opaque metal, and the other can be a transparent metal.

For example, in the light emitting display apparatus according to an embodiment of the present disclosure, when light is output toward an upper end of the cathode, the first anode AN1 configuring the first light emitting device ED1 can be an opaque metal and the cathode CA configuring the first light emitting device ED1 can be a transparent metal. Further, the second anode AN2 configuring the second light emitting device ED2 can be an opaque metal and the cathode CA configuring the second light emitting device ED2 can be a transparent metal. That is, the cathode CA included in the first light emitting device ED1 and the second light emitting device ED2 can be a transparent metal.

In this case, because light is output toward the upper end of the cathode, the pixel driving circuit PDC provided at a lower end of the cathode and anode can be provided to overlap the anode.

For example, as illustrated in FIG. 7, the first pixel driving circuit PDC1 can be provided to overlap the first anode AN1, and the second pixel driving circuit PDC2 can be provided to overlap the second anode AN2.

However, the transparent light emitting device TED can include a transparent anode TAN, a transparent cathode TCA, and a light emitting layer. The transparent anode TAN and transparent cathode TCA can be transparent metal. Therefore, light can be transmitted through the transparent light emitting device TED.

In this case, as illustrated in FIG. 7, the common cathode CA and the transparent cathode TCA are physically separated from each other and are not electrically connected. Accordingly, the first light emitting device ED1 and the second light emitting device ED2 can be adjacent to each other, and the transparent light emitting device TED can be spaced apart from the first light emitting device ED1 and the second light emitting device ED2.

The size of the first anode AN1 and the size of the second anode AN2 can be the same, and the size of the transparent anode TAN can be the same as the size of the first anode AN1 or the size of the second anode AN2.

However, the size of the transparent anode TAN can be larger than each of the size of the first anode AN1 and the size of the second anode AN2, and be smaller than the combined size of the first anode AN1 and the second anode AN2. Moreover, as illustrated in FIG. 7, the size of the transparent anode TAN can be larger than or equal to the combined size of the first anode AN1 and the second anode AN2. To provide an additional description, the size of the transparent anode TAN can be set to various sizes in consideration of the emission efficiency of the transparent pixel TP, the transmittance of the transparent pixel TP, and the transmittance of the light emitting display panel 100.

The transparent anode TAN can be connected to the anode line AL provided in parallel with the data line DL provided on the substrate configuring the light emitting display panel 100, and the transparent cathode TCA can be connected to a cathode line CL provided on the substrate.

Because the transparent pixel TP includes only the transparent light emitting device ED, the transparent light emitting device TED is not connected to the pixel driving circuit PDC.

However, because the transparent anode TAN is connected to the anode line AL and the transparent cathode TCA is connected to the cathode line CL, the anode voltage AVdata can be supplied to the transparent anode TNA through the anode line AL and the cathode voltage CV can be supplied to the transparent cathode TCA through the cathode line CL.

Accordingly, light can be output from the transparent light emitting device TED.

The cathode voltage CV can be the second voltage EVSS supplied to the cathode of the light emitting device ED, but can also be a voltage different from the second voltage EVSS. Hereinafter, a light emitting display apparatus according to the present disclosure will be described using an example in which the cathode voltage CV is the second voltage EVSS.

In this case, the substrate can be provided with a common cathode line connected to the common cathode CA. The common cathode line can be the second voltage supply line PLB described with reference to FIG. 2. Accordingly, in the following description, a reference numeral PLB can be given to the common cathode line.

The common cathode line PLB can be connected to common cathodes CA provided along the common cathode line PLB. The common cathode line PLB can extend in a direction parallel to the anode line AL, for example, along a Y-axis direction, as illustrated in FIG. 7.

In this case, the cathode line CL can extend along a different direction from the common cathode line PLB and the anode line AL, and particularly, extend along a direction vertical to the common cathode line PLB and the anode line AL.

For example, the cathode line CL can extend along an X-axis direction, as illustrated in FIGS. 1 and 7.

In the following description, a first direction can be the X-axis direction, and a second direction can be the Y-axis direction. To provide an additional description, the common cathode line PLB and the anode line AL can extend in the second direction (for example, the Y-axis direction), and the cathode line CL can extend in the first direction (for example, the X-axis direction) different from the direction of the common cathode line PLB and the anode line AL.

The substrate configuring the light emitting display panel 100 can be provided with a data line DL for supplying a data voltage to the first pixel driving circuit PDC1, and the substrate can be provided with a gate line GL for supplying a gate signal GS to the first pixel driving circuit PDC1.

For example, as described with reference to FIG. 2, the data line DL and the gate line GL can be connected to the pixel driving circuit PDC. Because the first pixel driving circuit PDC1 can have the same structure as the pixel driving circuit PDC illustrated in FIG. 2, the light emitting display panel 100 can be provided with a data line DL and a gate line GL which are connected to the first pixel driving circuit PDC1.

The common cathode line PLB can be provided in parallel with the data line DL, and the cathode line CL can be provided in parallel with the gate line GL.

For example, the cathode line CL and the gate line GL can be provided along the first direction (for example, the X-axis direction), and the common cathode line PLB and the data line DL can be provided along the second direction (for example, the Y-axis direction) different from the first direction.

In this case, the first color pixel P1, the second color pixel P2, and the transparent pixel TP can be provided in a row along the data line DL.

Because the anode line AL connected to the transparent anode TAN can be provided in parallel with the data line DL along the second direction, the first color pixel P1, the second color pixel P2, and the transparent pixel TP can be provided in a column along the anode line AL.

Moreover, because the common cathode line PLB can also be provided in parallel with the data line DL along the second direction, the first color pixel P1, the second color pixel P2, and the transparent pixel TP can be provided in a column along the common cathode line PLB.

The arrangement structure of the first color pixel P1, the second color pixel P2, and the transparent pixel TP can be repeated along the data line DL (or the anode line AL).

For example, as illustrated in FIG. 7, the second color pixel P2 can be provided below the first color pixel P1, the transparent pixel TP can be provided below the second color pixel P2, and another first color pixel P1, another second color pixel P2, and another transparent pixel TP can be provided below the transparent pixel TP, along the data line DL.

The light emitting display panel 100 can be further provided with another data line DL for supplying a data voltage to the second pixel driving circuit PDC2.

In the following description, when the data line DL connected to the first pixel driving circuit PDC1 and the data line DL connected to the second pixel driving circuit PDC2 are different, for convenience of description, the data line DL connected to the first pixel driving circuit PDC1 is referred to as a first color data line RDL, and the data line DL connected to the second pixel driving circuit PDC2 is referred to as a second color data line BDL.

For example, in the example described above, the data line connected to the first pixel driving circuit PDC1 can be the first color data line RDL, and another data line connected to the second pixel driving circuit PDC2 can be the second color data line BDL.

To provide an additional description, as illustrated in FIG. 7, when the first pixel driving circuit PDC1 and the second pixel driving circuit PDC2 are provided in a row along the anode line AL (or the common cathode line PLB), the first color data line RDL and the second color data line BDL can also be provided in parallel with the anode line AL. In this case, the first color data line RDL can be connected to the first pixel driving circuit PDC1 and the second color data line BDL can be connected to the second pixel driving circuit PDC2.

Accordingly, data voltages can be supplied to the first pixel driving circuit PDC1 and the second pixel driving circuit PDC2 at the same time, and a first color data voltage RVdata supplied to the first pixel driving circuit PDC1 can be different from a second color data voltage BVdata supplied to the second pixel driving circuit PDC2.

In this case, a gate line GL connected to the first pixel driving circuit PDC1 can be connected to the second pixel driving circuit PDC2, as illustrated in FIG. 7.

Accordingly, a switching transistor Tsw1 of the first pixel driving circuit PDC1 and a switching transistor Tsw1 of the second pixel driving circuit PDC2 can be turned on at the same time.

Further, an operation in which the first color data voltage RVdata is supplied to the first pixel driving circuit PDC1 through the first color data line RDL and an operation in which the second color data voltage BVdata is supplied to the second pixel driving circuit PDC2 through the second color data line BDL can be performed at the same time.

Accordingly, light can be output from the first color pixel P1 and the second color pixel P2 at the same time.

To provide an additional description, the first color pixel P1 and the second color pixel P2 adjacent to each other between two transparent pixels TP provided along the anode line AL can emit light at the same time.

Finally, in the example described above, the first color pixel P1 and the second color pixel P2 adjacent to each other between two transparent pixels TP provided along the anode line AL can emit light at the same time.

However, the first color pixel P1 and the second color pixel P2 adjacent to each other between two transparent pixels TP provided along the anode line AL can emit light at different timings.

In this case, the light emitting display panel 100 can be provided with a data line DL for supplying a data voltage to the first pixel driving circuit PDC1, can be provided with a gate line GL for supplying a gate signal GS to the first pixel driving circuit PDC1, and can be provided with another gate line GL for supplying a gate signal GS to the second pixel driving circuit PDC2, and a data line DL connected to the first pixel driving circuit PDC1 can be connected to the second pixel driving circuit PDC2.

To provide an additional description, the first pixel driving circuit PDC1 and the second pixel driving circuit PDC2 can be connected to one data line DL, and the gate line GL connected to the first pixel driving circuit PDC1 and the gate line GL connected to the second pixel driving circuit PDC2 can be different.

In this case, as described with reference to FIG. 3, a gate pulse GP can be sequentially supplied to the different gate lines GL.

Moreover, the data voltage Vdata corresponding to the first pixel driving circuit PDC1 and the data voltage Vdata corresponding to the second pixel driving circuit PDC2 can be sequentially supplied through the data line DL.

Therefore, when a gate pulse GP is supplied to the gate line GL connected to the first pixel driving circuit PDC1 and the data voltage Vdata corresponding to the first pixel driving circuit PDC1 is supplied to the data line DL, light can be output from the first light emitting device ED1 connected to the first pixel driving circuit PDC1.

Subsequently, when a gate pulse GP is supplied to the gate line GL connected to the second pixel driving circuit PDC2 and the data voltage Vdata corresponding to the second pixel driving circuit PDC2 is applied to the data line DL, light can be output from the second light emitting device ED2 connected to the second pixel driving circuit PDC2.

To provide an additional description, in the light emitting display apparatus according to the present disclosure, as illustrated in FIG. 7, the first pixel driving circuit PDC1 and the second pixel driving circuit PDC2 can be connected to one gate line, a first color data line RDL can be connected to the first pixel driving circuit PDC1, and a second color data line BDL can be connected to the second pixel driving circuit PDC2. In this case, for the first pixel driving circuit PDC1 and the second pixel driving circuit PDC2, two data lines RDL and BDL and one gate line GL can be provided in the light emitting display panel.

However, in the light emitting display apparatus according to the present disclosure, as described above, a gate line can be connected to the first pixel driving circuit PDC1, another gate line can be connected to the second pixel driving circuit PDC2, and one data line DL can be connected to the first pixel driving circuit PDC1 and the second pixel driving circuit PDC2. In this case, one data line DL and two gate lines GL can be provided in the light emitting display panel for the first pixel driving circuit PDC1 and the second pixel driving circuit PDC2.

Therefore, any one of the two examples described above can be applied to a light emitting display apparatus according to the present disclosure based on the transmittance in a case where two data lines RDL and BDL are provided in the second direction (Y-axis direction) and one gate line GL is provided in the first direction (X-axis direction), and the transmittance in a case where one data line DL is provided in the second direction (Y-axis direction) and two gate lines GL are provided in the first direction (X-axis direction).

Further, any one of the two examples described above can be applied to a light emitting display apparatus according to the present disclosure based on the difficulty in the design and manufacturing process of the two examples.

However, in addition to the connection structure of the data line DL and gate line GL described above, any one among various connection structures which can drive the first color pixel P1 and the second color pixel P2 can be applied to a light emitting display apparatus according to the present disclosure.

Hereinafter, for convenience of description, a light emitting display apparatus having the structure illustrated in FIG. 7 will be described as an example of a light emitting display apparatus according to the present disclosure.

Figure 8:
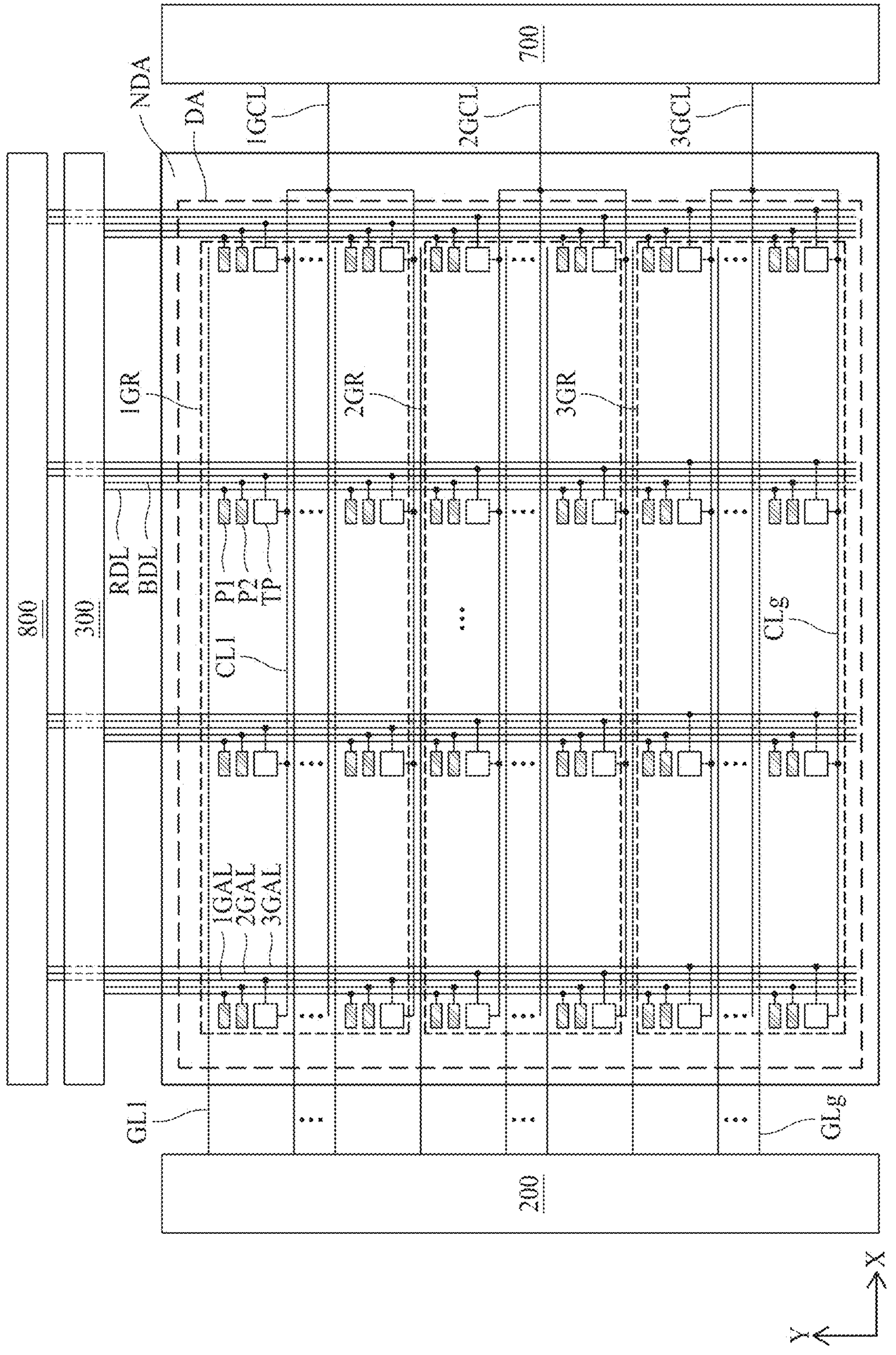
FIG. 8 is an exemplary diagram illustrating a light emitting display panel applied to a light emitting display apparatus according to an embodiment of the present disclosure.

FIG. 8 is an exemplary diagram illustrating a light emitting display panel applied to a light emitting display apparatus according to an embodiment of the present disclosure. Particularly, a light emitting display panel 100 having the structure illustrated in FIG. 7 is illustrated in FIG. 8. However, for convenience of description, the common cathode line PLB, sensing line SL, and first voltage supply line PLA illustrated in FIG. 7 are omitted in FIG. 8. Accordingly, a first color pixel P1 and a second color pixel P2 illustrated in FIG. 8 can be connected to the common cathode line PLB. In the following description, details which are the same as or similar to details described with reference to FIGS. 1 to 7 are omitted or will be briefly described.

First, a data line (for example, a first color data line RDL) for supplying a data voltage Vdata to the first pixel driving circuit PDC1 of the first color pixel P1 can be provided in the light emitting display panel 100. Also, first color pixels P1, second color pixels P2, and transparent pixels TP can be provided along the first color data line RDL. In the following description, when the first color data line RDL and the second color data line BDL do not need to be distinguished, each of the first color data line RDL and the second color data line BDL can be referred to as a data line DL.

In this case, the second color data line BDL can be connected to the second pixel driving circuit PDC2 of the second color pixel P2, and the gate line GL connected to the first pixel driving circuit PDC1 can also be connected to the second pixel driving circuit PDC2.

Transparent light emitting devices TED configuring transparent pixels TP can include transparent anodes TAN and transparent cathodes TCA.

The transparent pixels TP can be divided into a first group 1GR and a second group 2GR along the data line DL. For example, the first group 1GR and the second group 2GR can be provided along the data line DL. However, the transparent pixels TP can be divided into at least three groups.

For example, the number of groups can be set in various ways based on the size of the light emitting display panel 100, the number of cathode lines CL, the frequency used to drive the light emitting display panel 100, etc.

Hereinafter, as illustrated in FIG. 8, a light emitting display apparatus including transparent pixels TP divided into three groups 1GR, 2GR, and 3GR is described as example of a light emitting display apparatus according to an embodiment of the present disclosure.

In this case, transparent pixels TP included in the first group 1GR can output light at the same time, transparent pixels TP included in the second group 2GR can output light at the same time, and transparent pixels TP included in the third group 3GR can output light at the same time.

Moreover, the first to third groups 1GR to 3GR can sequentially output light.

In this case, the first group 1GR to the third group 3GR can output light of the same luminance or can output light of different luminance, by the anode driver 800 described with reference to FIG. 5

For example, the transparent pixels TP can be green pixels, and thus can output light of the same color (green color).

However, depending on the structure and function of the anode driver 800, the first group 1GR to the third group 3GR can output light with the same luminance or can output light with different luminance in the first frame period.

Further, the first group 1GR to the third group 3GR can output light with the same luminance during the first frame period, and can output light with luminance different from the luminance in the first frame period during a second frame period.

Moreover, the luminance of light output from the first group 1GR to the third group 3GR in the first frame period can be different from each other, and the luminance of light output from the first group 1GR to the third group 3GR in the second frame period can be different from each other. In this case, the luminance of the light output from the first group 1GR to the third group 3GR in the first frame period can be different from the luminance of light output from the first group 1GR to the third groups 3GR in the second frame period.

For example, the luminance of light output from each of the first to third groups 1GR to 3GR can vary depending on the image output from the light emitting display panel 100. Accordingly, the quality of the image output from a light emitting display apparatus according to the present disclosure can be the same as or similar to the quality of the image output from a light emitting display apparatus of the related art.

As described above, when the transparent pixels TP are divided into the first group 1GR to the third group 3GR, the light emitting display panel 100 can be provided with a first group anode line 1GAL connected to transparent anodes TAN included in the first group 1GR, a second group anode line 2GAL connected to transparent anodes TAN included in the second group 2GR, and a third group anode line 3GAL connected to transparent anodes TAN included in the third group 3GR, as illustrated in FIG. 8.

In this case, the first group anode line 1GAL, the second group anode line 2GAL, and the third group anode line 3GAL can be provided along the data line DL and can be adjacent to each other.

For example, transparent pixels TP provided along one data line DL can be divided into the first group 1GR to the third group 3GR, as illustrated in FIG. 8.

Among transparent pixels TP provided along one data line DL, transparent pixels TP included in the first group 1GR can be connected to the first group anode line 1GAL. Particularly, transparent anodes TAN of transparent pixels TP included in the first group 1GR can be connected to the first group anode line 1GAL.

Among transparent pixels TP provided along one data line DL, transparent pixels TP included in the second group 2GR can be connected to the second group anode line 2GAL. Particularly, transparent anodes TAN of transparent pixels TP included in the second group 2GR can be connected to the second group anode line 2GAL.

Among transparent pixels TP provided along one data line DL, transparent pixels TP included in the third group 3GR can be connected to the third group anode line 3GAL. Particularly, transparent anodes TAN of transparent pixels TP included in the third group 3GR can be connected to the third group anode line 3GAL.

The first group anode line 1GAL, the second group anode line 2GAL, and the third group anode line 3GAL can be provided along the data line DL and can be adjacent to each other.

In this case, as described with reference to FIG. 7, the first color pixel P1 and the second color pixel P2 provided in a row along the Y-axis direction can be connected to different data lines DL. For example, the first color data line RDL can be connected to the first color pixel P1, and the second color data line BDL can be connected to the second color pixel P2.

In this case, the first group anode line 1GAL, the second group anode line 2GAL, and the third group anode line 3GAL can be provided along the first color data line RDL and the second color data line BDL and can be adjacent to each other.

The structure as described above can be equally applied to other data lines DL (or other first color data lines RDL and other second color data lines BDL).

The light emitting display panel 100 can be divided into the display area DA provided with the first color pixels P1, the second color pixels P2, and the transparent pixels TP, and the non-display area NDA surrounding the display area DA.

The display area DA can be provided with cathode lines CL provided along a direction (for example, the first direction or the X-axis direction) different from a direction (for example, the second direction or the Y-axis direction) in which the data line DL is provided and connected to transparent cathodes TCA.

For example, transparent cathodes TCA provided in a row along the first direction (the X-axis direction) can be connected to the cathode line CL.

Accordingly, the light emitting display panel 100 can be provided with cathode lines CL the number of which is equal to the number of transparent cathodes TCA provided along one data line DL.

A first group cathode line 1GCL connected to cathode lines CL of transparent pixels TP included in the first group 1GR, a second group cathode line 2GCL connected to cathode lines CL of transparent pixels TP included in the second group 2GR, and a third group cathode line 3GCL connected to cathode lines CL of transparent pixels TP included in the third group 3GR can be provided in the non-display area NDA.

To provide an additional description, cathode lines CL included in the same group can be connected to each other.

In this case, a cathode voltage can be sequentially supplied to the first group cathode line 1GCL, the second group cathode line 2GCL, and the third group cathode line 3GCL from the cathode driver 700 described with reference to FIG. 4.

When the cathode voltage CV is supplied to the first group cathode line 1GCL, light can be output from transparent pixels TP connected to the first group cathode line 1GCL. When the cathode voltage CV is supplied to the second group cathode line 2GCL, light can be output from transparent pixels TP connected to the second group cathode line 2GCL. When the cathode voltage CV is supplied to the third group cathode line 3GCL, light can be output from transparent pixels TP connected to the third group cathode line 3GCL.

Accordingly, light can be output sequentially from the first group 1GR to the third group 3GR.

To this end, when the cathode voltage CV is supplied to the first group cathode line 1GCL, the anode voltage AVdata can be supplied to the first group anode line 1GAL, when the cathode voltage CV is supplied to the second group cathode line 2GCL, the anode voltage AVdata can be supplied to the second group anode line 2GAL, and when the cathode voltage CV is supplied to the third group cathode line 3GCL, the anode voltage AVdata can be supplied to the third group anode line 3GAL.

For example, the cathode voltage CV supplied to the first group cathode line 1GCL can be supplied to transparent cathodes TCA included in the first group 1GR, and the anode voltage AVdata supplied to the first group anode line 1GAL can be supplied to transparent anodes TAN included in the first group 1GR. Accordingly, light can be output from the transparent light emitting devices TED included in the first group 1GR.

The cathode voltage CV supplied to the second group cathode line 2GCL can be supplied to transparent cathodes TCA included in the second group 2GR, and the anode voltage A Vdata supplied to the second group anode line 2GAL can be supplied to transparent anodes TAN included in the second group 2GR. Accordingly, light can be output from the transparent light emitting devices TED included in the second group 2GR.

The cathode voltage CV supplied to the third group cathode line 3GCL can be supplied to transparent cathodes TCA included in the third group 3GR, and the anode voltage AVdata supplied to the third group anode line 3GAL can be supplied to transparent anodes TAN included in the third group 3GR. Accordingly, light can be output from the transparent light emitting devices TED included in the third group 3GR.

In this case, as described above, if the cathode voltage CV is sequentially supplied from the cathode driver 700 to the first group cathode line 1GCL, the second group cathode line 2GCL, and the third group cathode line 3GCL, and the anode voltage AVdata is supplied from the anode driver 800 to the first group anode line 1GAL, the second group anode line 2GAL, and the third group anode line 3GAL, light can be output sequentially from the first group 1GR to the third group 3GR.

When the cathode lines CL are divided into a first group cathode line 1GCL to an nth group cathode line (n is a natural number less than or equal to the number of cathode lines CL), the cathode voltage CV can be supplied to each of the first group cathode line 1GCL to the nth group cathode lines for 1/n period of one frame period.

For example, as illustrated in FIG. 8, when the cathode lines CL are divided into a first group cathode line 1GCL to a third group cathode line 3GCL, the cathode voltage CV can be supplied to each of the first group cathode line 1GCL to the third group cathode lines 3GCL for a ⅓ period of one frame period.

For example, when the light emitting display apparatus according to the present disclosure displays 120 images for one second, one frame period can be 1/120 second.

When one frame period is 1/120 second, the cathode voltage CV can be supplied to each of the first group cathode line 1GCL to the third group cathode line 3GCL for a period of 1/360 second.

To provide an additional description, if the cathode voltage CV is sequentially supplied to each of the cathode lines CL, a period during which the cathode voltage CV is supplied to the cathode line CL may be shorter than 1/360 second. If the period during which the cathode voltage CV is supplied is shortened, a period during which light emitting devices connected to the cathode line CL to which the cathode voltage CV is supplied emit light is shortened.

If the cathode voltage CV is not supplied to the cathode line CL, the light emitting devices connected to the cathode line CL does not output light any longer.

In this case, image sticking of the light output from the light emitting devices connected to the cathode line CL should remain until light is output from the light emitting devices connected to the last cathode line CL in order for one image to be displayed normally.

However, as described above, if a period during which the cathode voltage CV is supplied to the cathode line CL is shortened, a period during which light emitting devices ED connected to the first cathode line CL1 emit light may be shortened.

Accordingly, the image sticking of the light output from the light emitting devices ED connected to the first cathode line CL1 cannot remain until light is output from light emitting devices ED connected to a gth cathode line CLg. Therefore, an image cannot be displayed normally during one frame period.

However, as in the light emitting display apparatus according to the present disclosure, if the cathode lines CL are divided into groups, a period during which the cathode voltage CV is supplied to the cathode line CL can be lengthened, and thus a period during which light is output from light emitting devices ED connected to the first cathode line CL1 can be lengthened.

Accordingly, the image sticking of the light output from the light emitting devices ED connected to the first cathode line CL1 can remain until light is output from the light emitting devices ED connected to the gth cathode line CLg. Therefore, an image can be displayed normally during one frame period.

Finally, the gate driver 200 can be provided to supply gate signals to the first pixel driving circuit PDC1 and the second pixel driving circuit PDC2, and the cathode driver 700 can be provided in the light emitting display panel 100 to sequentially supply the cathode voltage CV to the cathode lines CL.

For example, the gate driver 200 can sequentially supply gate pulses GP to the gate lines GL. Moreover, the cathode driver 700 can sequentially supply cathode voltages CV to the cathode lines CL, or sequentially supply cathode voltages CV to the group cathode lines GCL.

As described above, the gate driver 200 can be directly embedded into the non-display area NDA by using a gate in panel (GIP) type, or the gate driver 200 can be provided in the display area DA in which light emitting devices ED are provided, or the gate driver 200 can be provided on a chip on film mounted in the non-display area NDA.

Further, as described above, the cathode driver 700 can also be directly embedded into the non-display area NDA, or the cathode driver 700 can be provided in the display area DA in which light emitting devices ED are provided, or the cathode driver 700 can be provided on a chip on film mounted in the non-display area NDA.

In this case, when the gate driver 200 is provided in the non-display area NDA provided on the left side of the light emitting display panel 100, as illustrated in FIGS. 1 and 8, the cathode driver 700 can be provided on the right side of the light emitting display panel 100.

However, as described above, when the cathode driver 700 includes the power supply unit 500 and the power control unit which can generate the power control signal capable of controlling the power supply unit 500, and the cathode voltage generator provided in the power supply unit 500 is connected to the cathode lines CL or the group cathode lines GCL through the cathode switches, the power control unit can sequentially turn on the cathode switches.

In this case, the power control unit can be provided in the non-display area NDA of the light emitting display panel 100, can be provided in the control driver 400, can be provided in the power supply unit 500, and can be provided on a printed circuit board on which the power supply unit 500 and the control driver 400 is mounted.

Figure 9:
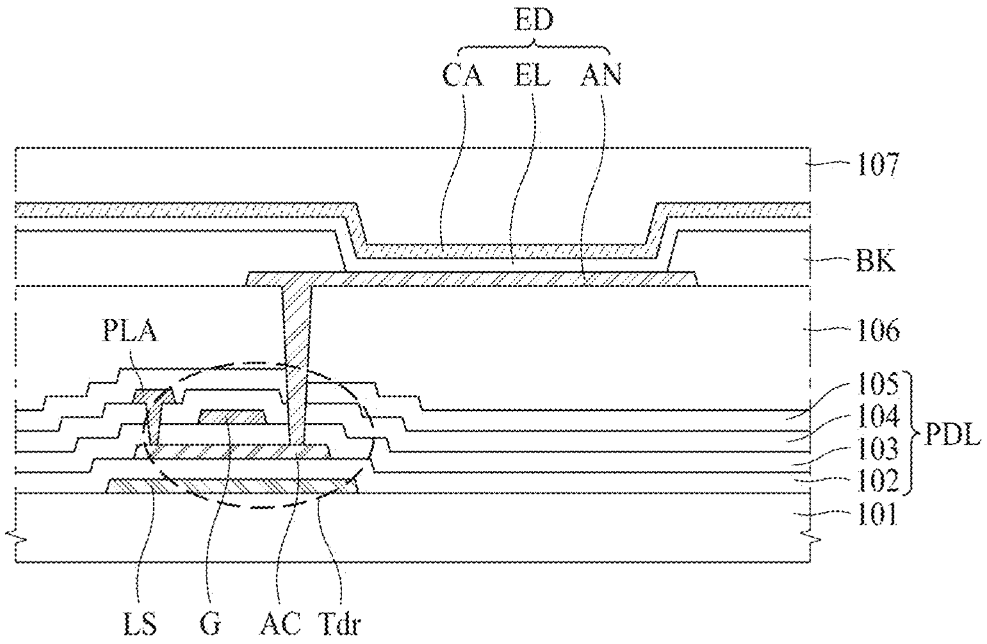
FIG. 9 is an exemplary diagram schematically illustrating a cross-sectional surface of a pixel applied to a light emitting display apparatus according to an embodiment of the present disclosure.
Figure 10:
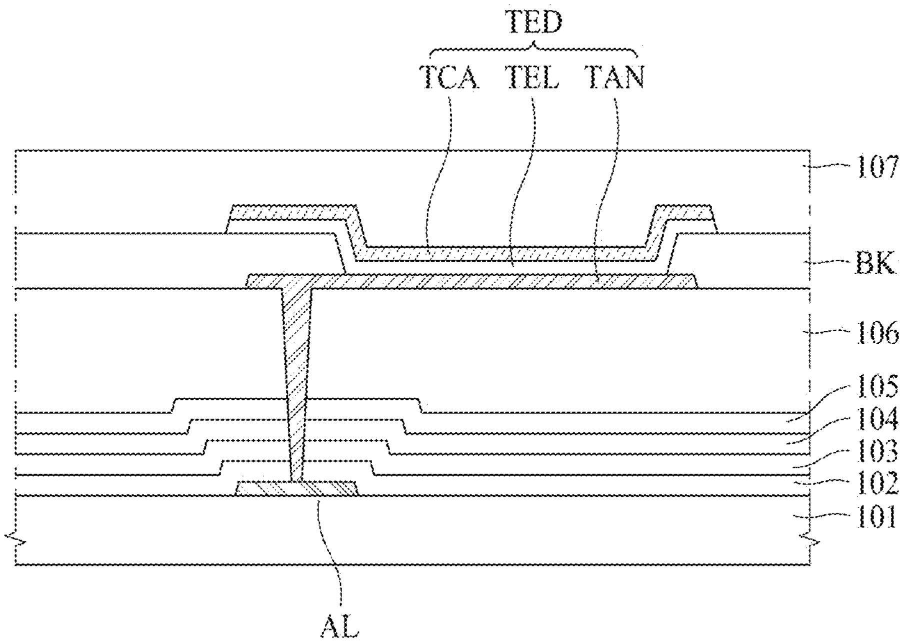
FIG. 10 is an exemplary diagram schematically illustrating a cross-sectional surface of a transparent pixel applied to a light emitting display apparatus according to an embodiment of the present disclosure.

FIG. 9 is an exemplary diagram schematically illustrating a cross-sectional surface of a pixel applied to a light emitting display apparatus according to an embodiment of the present disclosure, and FIG. 10 is an exemplary diagram schematically illustrating a cross-sectional surface of a transparent pixel applied to a light emitting display apparatus according to an embodiment of the present disclosure. Particularly, a cross-sectional surface of an area in which a driving transistor Tdr and a light emitting device ED are provided among the light emitting display panel 100 is illustrated in FIG. 9. For example, FIG. 9 illustrates a cross-sectional surface of a pixel P. In the following description, the pixel P can be the first color pixel P1 or the second color pixel P2.

As described above, the pixel driving circuit PDC can overlap the light emitting device ED, and in FIG. 9, a cross-sectional surface in which the driving transistor Tdr of the pixel driving circuit PDC overlaps the light emitting device ED is illustrated.

As illustrated in FIG. 9, a light emitting display panel 100 applied to a light emitting display apparatus according to an embodiment of the present disclosure can include a substrate 101, a pixel driving circuit layer PDL provided on the substrate 101, a planarization layer 106 provided on the pixel driving circuit layer PDL to cover the pixel driving circuit layer PDL, an anode AN provided on the planarization layer 106, a light emitting layer EL provided on the anode AN, a cathode CA provided on the light emitting layer EL, and an encapsulation layer 107 covering the cathode CA.

First, a cross-sectional structure of the pixel P will be described with reference to FIG. 9. The substrate 101 can be a glass substrate or a plastic substrate, but is not limited thereto and can be formed of one of various kinds of films.

The pixel driving circuit layer PDL including the driving transistor Tdr can be provided on the substrate A pixel driving circuit PDC including the driving transistor Tdr can be provided in the pixel driving circuit layer PDL. The pixel driving circuit PDC, as described above with reference to FIG. 2, can include a switching transistor Tsw1, a storage capacitor Cst, a driving transistor Tdr, and a sensing transistor Tsw2. For example, at least two transistors can be provided in the pixel driving circuit layer PDL.

Each of the transistors can include an active layer AC including a semiconductor, a gate insulation layer 103 which is provided on the active layer AC, and a gate G which is provided on the gate insulation layer 103.

The gate G can be covered by the gate insulation layer 104, and various electrodes or lines can be provided on the gate insulation layer 104.

An electrode or a line provided on the insulation layer 104 can be covered by a passivation layer 105, and the passivation layer 105 can be covered by the planarization layer 106.

For example, the driving transistor Tdr illustrated in FIG. 9 can include an active layer AC provided on the buffer 102, a gate insulation layer 103 provided on the active layer AC, a gate G provided on the insulation layer 103, an insulation layer 104 covering an upper end of the gate G, a first voltage supply line PLA connected to a first terminal of the driving transistor Tdr, and a passivation layer 105 covering the first voltage supply line PLA. In this case, other transistors provided in the pixel driving circuit PDC can also be formed in a similar shape to the driving transistor Tdr illustrated in FIG. 9.

However, the structure of the driving transistor Tdr and other transistors is not limited to the structure of the driving transistor Tdr illustrated in FIG. 9. Accordingly, the structures of the driving transistor Tdr and other transistors can be changed into various shapes.

In this case, as illustrated in FIG. 9, a light blocking electrode LS (e.g., a light shield) can be provided at a lower end of the driving transistor Tdr in order to block external light which incidents on the active layer AC during the manufacturing process of the light emitting display apparatus or while the light emitting display apparatus is in use.

The light blocking electrode LS can be connected to any one of a gate, first gate electrode, and second gate electrode of the driving transistor Tdr.

Another light blocking electrode provided on the same layer as the light blocking electrode LS can be used as various lines, for example, a data line DL or a gate line GL.

Accordingly, each of the light blocking electrode LS and another light blocking electrode can be provided in a floating state or can be connected to a signal line to which a voltage is supplied.

A light blocking electrode LS may or may not be provided at a lower end of other transistors provided in the pixel driving circuit layer PDL. That is, the light blocking electrode LS can be provided not only at a lower end of the driving transistor Tdr, but also at a lower end of another transistor requiring light blocking, and can be provided in areas requiring light blocking among areas not provided with transistors.

The light blocking electrode LS can be provided on the substrate 101, the light blocking electrode LS can be covered by the buffer 102, and the active layer AC can be provided on the buffer 102.

Further, a data line DL, a gate line GL, a sensing control line SCL, a sensing line SL, and a first voltage supply line PLA which are connected to the pixel driving circuit PDC can be provided in the pixel driving circuit layer PDL.

Hereinafter, a generic name for the data line DL, the gate line GL, the sensing line SL, and the first voltage supply line PLA can be a signal line. That is, at least one signal line can be provided in the pixel driving circuit layer PDL.

Each of the buffer 102, the gate insulation layer 103, the insulation layer 104, and the passivation layer 105 can be formed of at least one inorganic layer, or at least one organic layer, or at least one inorganic layer and at least one organic layer. The buffer 102, the gate insulation layer 103, the insulation layer 104, and the passivation layer 105 can perform an insulation function. Accordingly, each of the buffer 102, the gate insulation layer 103, the insulation layer 104, and the passivation layer 105 can be referred to as an insulation functional layer.

The gate of the driving transistor Tdr, the light blocking electrode LS, and the signal lines are metal. Accordingly, a layer provided with at least one of the gate, the light blocking electrode LS, and the signal line can be referred to as a metal layer.

That is, the pixel driving circuit layer PDL can include at least two metal layers and at least two insulation functional layers.

The planarization layer 103 can be provided on the pixel driving circuit layer 102.

The planarization layer 106 can perform a function of planarizing an upper surface of the pixel driving circuit layer PDL, which is not flat. To this end, the planarization layer 106 can be formed to have a thickness greater than the pixel driving circuit layer PDL, and accordingly, the upper surface of the planarization layer 106 can be planarized.

The planarization layer 106 can be formed of at least one organic layer, or at least one inorganic layer, or at least one inorganic layer and at least one organic layer.

The anode AN can be provided on the planarization layer 106. The anode can configure the light emitting device ED.

As illustrated in FIGS. 2 and 9, the anode AN is electrically connected to the driving transistor Tdr provided in the pixel driving circuit layer PDL, and is patterned for each pixel P. Accordingly, the anodes AN provided in the pixels P are physically and electrically separated from each other.

The anode AN can be formed of a transparent metal such as indium tin oxide (ITO) or indium zinc oxide (IZO), and can be formed of an opaque metal such as silver (Ag), aluminum (Al), copper (Cu), molybdenum (Mo), titanium (Ti), nickel (Ni), chromium (Cr), and tungsten (W). Particularly, when the light emitting display panel 100 according to the present disclosure uses a top emission type, light generated in the light emitting device ED can be output toward the cathode CA. In this case, the anode AN can be formed of an opaque metal to reflect light transmitted from the light emitting device ED toward the cathode CA.

The bank BK can be provided in the planarization layer 106 and can include an opening portion through which the anode AN is exposed.

For example, the bank BK covers the outer edges of the anode AN to form the opening portion through which light is output from the pixel P. That is, an area which is not covered by the bank BK in the anode AN illustrated in FIG. 9 is the opening portion. The opening portion can be the light emitting area EA.

To provide an additional description, the bank BK covers the outer edges of the anode AN and can be provided in the display area DA of the substrate 101 so that the anode AN is exposed.

The bank BK can prevent or at least reduce light from overlapping between adjacent pixels.

The bank BK can be formed of at least one inorganic layer, or at least one organic layer, or at least one inorganic layer and at least one organic layer.

The light emitting layer EL can be provided on the substrate 101 to cover the anode AN and the bank BK.

For example, the light emitting layer EL can be continuously provided in the first color pixel P1 and the second color pixel P2, and may not be provided in the transmission area TA. However, the light emitting layer EL can be provided in each of the first color pixel P1 and the second color pixel P2, and a light emitting layer EL provided in the first color pixel P1 and a light emitting layer EL provided in the second color pixel P2 can be separated from each other.

Further, the light emitting layer EL provided in the first color pixel P1 and the second color pixel P2 can extend to the transparent pixel TP, or can be separated from a light emitting layer provided in the transparent pixel TP.

The light emitting layer EL can include one of an organic light emitting layer, an inorganic light emitting layer, and a quantum dot light emitting layer. Alternatively, the light emitting device EL can include a stack or combination structure of the organic light emitting layer (or the inorganic light emitting layer) and the quantum dot light emitting layer.

The light emitting layer EL can include a hole injection layer (HIL), a hole transport layer (HTL), a hole blocking layer (HBL), an electron injection layer (EIL), an electron transport layer (ETL), an electron blocking layer (EBL), and a charge generating layer (CGL).

In a case where the light emitting layer EL emits white light, the light emitting layer EL can include a hole injection layer (HIL)/hole transport layer (HTL), a blue organic layer, an electron injection layer (EIL)/charge generating layer (CGL)/electron transport layer (ETL), a red organic layer, a yellow green organic layer, an electron injection layer (EIL)/charge generating layer (CGL)/electron transport layer (ETL), a blue organic layer, an electron injection layer (EIL)/electron transport layer (ETL), and an organic buffer, which are sequentially stacked on the anode AN.

The light emitting layer EL can include a plurality of layers having various stack orders, in addition to layers having a stack order as described above.

The cathode CA can be provided on the light emitting layer EL,

The cathode CA can be continuously provided in the first color pixel P1 and the second color pixel P2, and may not be provided in the transmission area TA.

Further, the cathode CA provided in the first color pixel P1 and the second color pixel P2 is separated from a transparent cathode TCA provided in the transparent pixel TP.

In a case where the light emitting device ED emits white light, a color filter can be provided under the anode AN or on the cathode.

For example, when the light emitting display panel 100 uses a top emission type, the color filter can be provided at an upper end of the cathode CA, The cathode CA can be covered by the encapsulation layer 107.

The encapsulation layer 107 can be formed of at least one organic layer, or at least one inorganic layer, or at least one inorganic layer and at least one organic layer.

Moisture and oxygen flowing in from the outside can be blocked by the encapsulation layer 106, and thus, cannot penetrate into the light emitting layer EL.

The cross-sectional structure of the pixel P as described above can be commonly applied to the first color pixels P1 and the second color pixels P2 illustrated in FIG. 8.

Second, the cross-sectional structure of the transparent pixel TP will be described with reference to FIG. 10. In the following description, details which are the same as or similar to details described with reference to FIG. 9 are omitted or will be briefly described.

The substrate 101 can be a glass substrate or a plastic substrate, but is not limited thereto and can be formed of one of various kinds of films.

Because the transparent pixel TP is not provided with a pixel driving circuit PDC, the cross-sectional surface of the transparent pixel TP is not provided with a pixel driving circuit layer PDL. That is, the transparent pixel TP lacks a pixel driving circuit layer PDL.

An anode line AL can be provided on the substrate 101. For example, the anode line AL can be provided on an upper surface of the substrate 101. However, the anode line AL can be provided on an upper surface of any one of the buffer 102, the gate insulation layer 103, the insulation layer 104, and the passivation layer 105.

Further, the anode line AL illustrated in FIG. 10 can be an anode line AL illustrated in FIGS. 7 and 8, or an anode connection line connecting the anode line AL and the transparent anode TAN which are illustrated in FIGS. 7 and 8.

To provide an additional description, the anode line AL illustrated in FIGS. 7 and 8 can be the anode line AL itself, or can be the anode connection line connected to the anode line AL.

When the anode line AL is provided on the upper surface of the substrate 101, the anode line AL can be any one of the light blocking electrodes provided on the substrate 101.

When the anode line AL is provided on the upper surface of the substrate 101, at least one of the buffer 102, the gate insulation layer 103, the insulation layer 104, and the passivation layer can be provided on an upper end of the anode line AL.

The planarization layer 106 can be provided on the pixel driving circuit layer PDL. The transparent anode TAN can be provided on the planarization layer 106. The transparent anode TAN can configure the transparent light emitting device TED. As illustrated in FIG. 10, the transparent anode TAN is patterned on each of the transparent pixels TP. The transparent anode TAN may be directly connected to the anode line AL thereby obviating the need for a pixel driving circuit in the transparent pixel TP.

Accordingly, the transparent anodes TAN provided in the transparent pixels TP are physically and electrically separated from each other. Further, the transparent anode TAN is separated from the anodes AN.

The transparent anode TAN can be formed of a transparent metal such as indium tin oxide (ITO) or indium zinc oxide (IZO).

The bank BK can be provided on the planarization layer 106 and can include an opening portion through which the transparent anode TAN is exposed.

For example, the bank BK can cover the outer edges of the transparent anode TAN to form the opening portion through which light is output from the transparent pixel TP. That is, an area which is not covered by the bank BK in the transparent anode TAN illustrated in FIG. 10 is the opening portion. The opening portion can be the light emitting area EA.

To provide an additional description, the bank BK covers the outer edges of the transparent anode TAN and can be provided in the display area DA of the substrate 101 so that the anode AN is exposed.

However, the bank BK may not be provided outside the transparent anode TAN.

A transparent light emitting layer TEL can be provided on the substrate 101 to cover the transparent anode TAN and the bank BK The transparent light emitting layer TEL may not be provided in the transmission area TA.

Further, the transparent light emitting layer TEL can be connected to a light emitting layer EL provided in the first color pixel P1 and the second color pixel P2, but can also be separated from the light emitting layer EL.

The transparent light emitting layer TEL can be formed with the same or similar structure to the light emitting layer EL described above. Because the transparent light emitting layer TEL can be formed to be thin enough to allow light to pass through, light can be transmitted through the transparent light emitting layer TEL. Moreover, because each of the materials configuring the transparent light emitting layer TEL can be formed of a material which can transmit light, light can be transmitted through the transparent light emitting layer TEL.

A transparent cathode TCA can be provided on the transparent light emitting layer TEL.

The transparent cathode TCA can be formed of a transparent metal such as indium tin oxide (ITO) or indium zinc oxide (IZO). Accordingly, light generated in the transparent light emitting layer TEL can be output to the outside of the light emitting display panel 100 through the transparent cathode TCA.

Moreover, because the transparent anode TAN and the transparent cathode TCA are formed of transparent metal, and the transparent light emitting layer TEL can also be formed transparently, light can be transmitted in the transparent light emitting device TED.

The transparent cathode TCA can be provided only in the transparent pixel TP and may not be provided in the transmission area TA.

Further, the transparent cathode TCA is separated from the cathode CA provided in the first color pixel P1 and the second color pixel P2.

In a case, the transparent light emitting device TED emits white light, a color filter can be provided under the transparent anode TAN or on the transparent cathode TCA.

For example, when the light emitting display panel 100 uses a top emission type, the color filter can be provided at an upper end of the transparent cathode TCA.

The transparent cathode TCA can be covered by the encapsulation layer 107.

Figure 11:
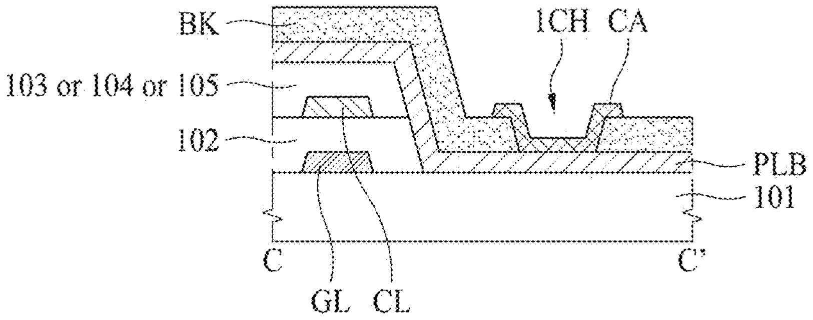
FIG. 11 is an exemplary diagram illustrating a cross-sectional surface taken along line C-C' of FIG. 7 according to an embodiment of the present disclosure.
Figure 12:
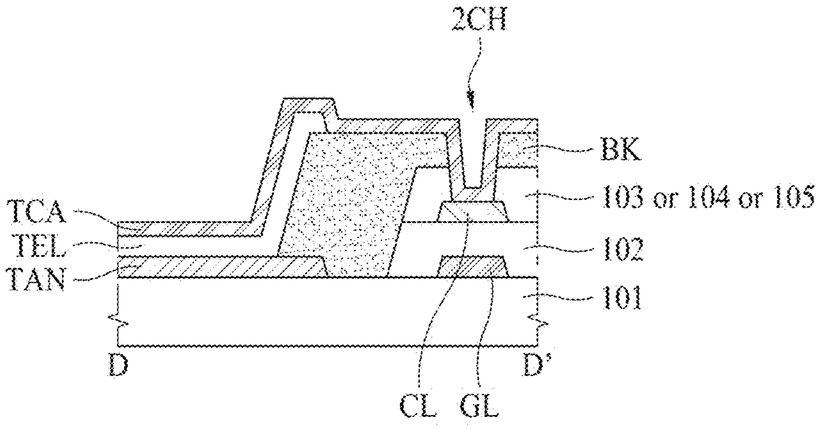
FIG. 12 is an exemplary diagram illustrating a cross-sectional surface taken along line D-D' of FIG. 7 according to an embodiment of the present disclosure.
Figure 13:
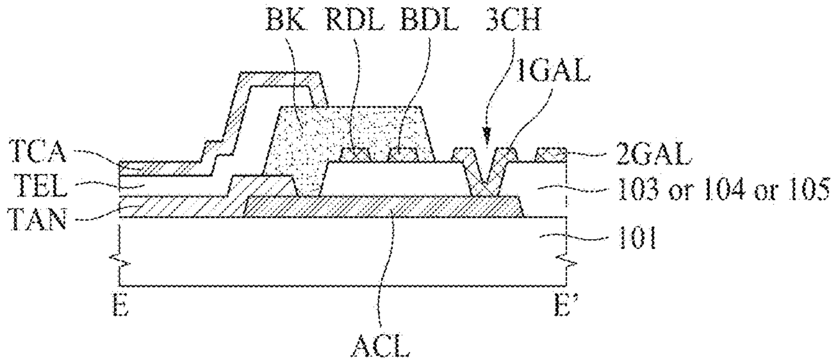
FIG. 13 is an exemplary diagram illustrating a cross-sectional surface taken along line E-E' of FIG. 7 according to an embodiment of the present disclosure.

FIG. 11 is an exemplary diagram illustrating a cross-sectional surface taken along line C-C' of FIG. 7 according to one embodiment, FIG. 12 is an exemplary diagram illustrating a cross-sectional surface taken along line D-D' of FIG. 7 according to one embodiment, and FIG. 13 is an exemplary diagram illustrating a cross-sectional surface taken along line E-E' of FIG. 7 according to one embodiment. In the following description, details which are the same as or similar to details described with reference to FIGS. 1 to 10 are omitted or will be briefly described.

First, FIG. 11 illustrates a cross-sectional surface of an area in which the common cathode line PLB, the gate line GL, and the cathode line CL intersect.

For example, as described above, the cathode line CL and the gate line GL can be provided along the first direction (the X-axis direction) of the light emitting display panel 100, and the common cathode line PLB can be provided along the second direction (the Y-axis direction).

The cathode line CL can be connected to the cathode driver 700, the gate line GL can be connected to the gate driver 200, and the common cathode line PLB can be connected to the power supply unit 500.

Accordingly, the cathode line CL and the gate line GL can intersect the common cathode line PLB.

The common cathode line PLB can be connected to the cathode CA configuring the first light emitting device ED1 provided in the first color pixel P1 and the second light emitting device ED2 provided in the second color pixel P2. For example, the cathode CA configuring the first light emitting device ED1 and the cathode CA configuring the second light emitting device ED2 can be formed as one plate, and the cathode CA can be connected to the common cathode line PLB.

The cathode line CL and the gate line GL can be, as illustrated in FIG. 7, parallelly provided on the same layer, but can be provided on different layers, as illustrated in FIG. 11.

For example, as illustrated in FIG. 11, the gate line GL can be provided on the upper surface of the substrate 101, the gate line GL can be covered by the buffer 102, and the cathode line CL can be provided on the upper surface of the buffer 102.

The cathode line CL can be covered by the gate insulation layer 103 or the insulation layer 104 or the passivation layer 105, or can be covered by at least two of the gate insulation layer 103, the insulation layer 104, and the passivation layer 105.

In this case, the gate line GL and the cathode line CL can be provided to overlap.

The common cathode line PLB can be provided on the upper surface of the substrate 101. However, in an area where the common cathode line PLB intersects the gate line GL and the cathode line CL, the common cathode line PLB can be provided on an upper end of at least one of the gate insulation layer 103, the insulation layer 104, and the passivation layer 105.

Each of the gate line GL, the cathode line CL, and the common cathode line PLB can be formed of an opaque metal such as silver (Ag), aluminum (Al), copper (Cu), molybdenum (Mo), titanium (Ti), nickel (Ni), chromium (Cr), and tungsten (W), but can be formed of a transparent metal such as indium tin oxide (ITO) or indium zinc oxide (IZO) to improve a transmittance.

For example, an area provided with the gate line GL, the cathode line CL, and the common cathode line PLB can be the transmission area TA.

The cathode CA provided on the bank BK can be connected to the gate line GL, the cathode line CL, and the common cathode line PLB through a first contact hole 1CH passing through at least one of the buffer 102, the gate insulation layer 103, the insulation layer 104, the passivation layer 105, the planarization layer 106, and the bank BK. Particularly, as illustrated in FIG. 11, the cathode CA can be connected to the common cathode line PLB through the first contact hole 1CH provided in the bank BK.

For example, when the gate line GL, the cathode line CL, and the common cathode line PLB are formed of a transparent metal, in order to improve the transmittance in the common cathode line PLB, the common cathode line PLB can be covered only by the bank BK, and thus can be connected to the cathode CA through the first contact hole 1CH provided in the bank BK.

Next, FIG. 12 illustrates a cross-sectional surface of an area in which the cathode line CL is connected to the transparent cathode TCA.

For example, as described above, the cathode line CL and the gate line GL can be provided along the first direction (the X-axis direction) of the light emitting display panel 100, and the cathode line CL can be connected to the transparent cathode TCA.

The cathode line CL and the gate line GL can be parallelly provided on the same layer, but can be provided on different layers, as illustrated in FIGS. 11 and 12.

For example, as illustrated in FIGS. 11 and 12, the gate line GL can be provided on the upper surface of the substrate 101, the gate line GL can be covered by the buffer 102, the cathode line CL can be provided on the upper surface of the buffer 102, the cathode line CL can be covered by any one of the gate insulation layer 103, the insulation layer 104, the passivation layer 105, and the planarization layer 106, any one of the gate insulation layer 103, the insulation layer 104, the passivation layer 105, and the planarization layer 106 can be covered by the bank BK, and the transparent cathode TCA can be provided on the bank BK. However, the cathode line CL can be covered by at least two of the gate insulation layer 103, the insulation layer 104, the passivation layer 105, and the planarization layer 106.

In this case, the gate line GL and the cathode line CL can be provided to overlap.

The transparent cathode TCA provided on the bank BK can be connected to the cathode line CL through a second contact hole 2CH passing through at least one of the gate insulation layer 103, the insulation layer 104, the passivation layer 105, the planarization layer 106, and the bank BK. Particularly, as illustrated in FIG. 12, the transparent cathode TCA can be connected to the cathode line CL through the second contact hole 2CH provided in the bank and at least one of the gate insulation layer 103, the insulation layer 104, and the passivation layer 105.

In this case, the transparent anode TAN configuring the transparent light emitting device TED together with the transparent cathode TCA and the transparent light emitting layer TEL can be provided on the upper surface of the substrate 101, as illustrated in FIG. 12.

For example, the transparent anode TAN can be provided on the upper surface of the planarization layer 106, as illustrated in FIG. 10, but in order to improve the transmittance in the transparent light emitting device TED, the transparent anode TAN can be provided on the upper surface of the substrate 101, as illustrated in FIG. 12.

To provide an additional description, the buffer 102, the gate insulation layer 103, the insulation layer 104, the passivation layer 105, and the planarization layer 106 may not be provided in an area in which the transparent anode TAN is provided. Accordingly, the transmittance of the transparent light emitting device TED can be improved.

However, the area in which the transparent anode TAN is provided can be provided with at least one of the buffer 102, the gate insulation layer 103, the insulation layer 104, the passivation layer 105, and the planarization layer 106.

The transparent light emitting layer TEL can be provided between the transparent anode TAN and the transparent cathode TCA.

Finally, FIG. 13 illustrates a cross-sectional surface of an area provided with the first color data line RDL, the second color data line BDL, and the group anode line GAL. The first color data line RDL, the second color data line BDL, and at least two group anode lines GAL can be provided in parallel on the same layer. Among at least two group anode lines GAL, a first group anode line 1GAL and a second group anode line 2GAL adjacent to the transparent anode TAN are illustrated in the cross-sectional surface illustrated in FIG. 13. Further, FIG. 13 illustrates a cross-sectional surface in which the first group anode line 1GAL closest to the transparent anode TAN is connected to the transparent anode TAN.

For example, as described above, the first color data line RDL, the second color data line BDL, and the anode lines AL can be provided along the second direction (the Y-axis direction) of the light emitting display panel 100.

The first color data line RDL and the second color data line BDL can be connected to the data driver 300, and at least two group anode lines GAL can be connected to the anode driver 800.

One group anode line GAL can be connected to the transparent anode TAN through an anode connection line ACL.

For example, as described above and illustrated in FIG. 13, the transparent anode TAN can be provided on the upper surface of the substrate 101. In this case, the anode connection line ACL connected to the transparent anode TAN can be provided on the upper surface of the substrate 101.

The anode connection line ACL can be covered by at least one of the buffer 102, the gate insulation layer 103, the insulation layer 104, the passivation layer 105, and the planarization layer 106.

The first color data line RDL, the second color data line BDL, and at least two group anode lines GAL can be provided on at least one of the buffer 102, the gate insulation layer 103, the insulation layer 104, the passivation layer 105, and the planarization layer 106.

Particularly, the first color data line RDL, the second color data line BDL, and at least two group anode lines GAL can be provided in a layer in which the gate line GL and the cathode line CL are not provided.

For example, when the gate line GL is provided on the upper surface of the substrate 101 and the cathode line CL is provided on the upper surface of the buffer 102, the first color data line RDL, the second color data line BDL, and at least two group anode lines GAL can be provided on any one of the gate insulation layer 103, the insulation layer 104, and the passivation layer 105.

Any one of the at least two group anode lines GAL can be connected to the anode connection line ACL through a third contact hole 3CH passing through at least one of the gate insulation layer 103, the insulation layer 104, and the passivation layer 105, and can be connected to the transparent anode TAN through the anode connection line ACL.

In this case, the transparent anode TAN configuring the transparent light emitting device TED together with the transparent cathode CA and the transparent light emitting layer TEL can be provided on the upper surface of the substrate 101, as described with reference to FIG. 12.

The transparent light emitting layer TEL can be provided on the transparent anode TAN, and the transparent cathode CA can be provided on the upper surface of the transparent light emitting layer TEL and the upper surface of the bank BK.

However, the arrangement structure of the gate line GL, the cathode line CL, the common cathode line PLB, the first color data line RDL, the second color data line BDL, and the at least two group anode lines GAL is not limited to the structure described above.

Accordingly, the arrangement structure of the gate line GL, the cathode line CL, the common cathode line PLB, the first color data line RDL, the second color data line BDL, and the at least two group anode lines GAL can be changed in various forms.

Further, each of the first color data line RDL, the second color data line BDL, and the at least two group anode lines GAL can be formed of an opaque metal such as silver (Ag), aluminum (Al), copper (Cu), and molybdenum (Mo), titanium (Ti), nickel (Ni), chromium (Cr), and tungsten (W), but can be formed of a transparent metal such as indium tin oxide (ITO) or indium zinc oxide (IZO) to improve a transmittance.

For example, the first color data line RDL, the second color data line BDL, and the at least two group anode lines GAL can be the transmission area TA.

In this case, the first color data line RDL, the second color data line BDL, and the at least two group anode lines GAL may not be covered by the bank BK.

Moreover, the first color data line RDL and the second color data line BDL can be formed of an opaque metal, but in order to improve the transmittance, the at least two group anode lines GAL can be formed of a transparent metal such as indium tin oxide (ITO) or Indium Zinc Oxide (ZO).

For example, the at least two group anode lines GAL can be the transmission area TA.

In this case, as illustrated in FIG. 13, the first color data line RDL and the second color data line BDL can be covered by the bank BK, and the at least two group anode lines GAL may not be covered by the bank BK.

According to the present disclosure as described above, the area of the transmission area TA can be increased compared to the prior art, and thus, the transmittance of a light emitting display panel can be increased compared to the prior art.

The features of the light emitting display apparatus according to an embodiment of the present disclosure are briefly summarized as follows.

A light emitting display apparatus according to an embodiment of the present disclosure comprises a substrate configured to be divided into a transmission area through which light is transmitted and a non-transmission area through which light is blocked, a first color pixel configured to be provided in the non-transmission area and include a first pixel driving circuit and a first light emitting device, a second color pixel configured to be provided in the non-transmission area and include a second pixel driving circuit and a second light emitting device, and a transparent pixel configured to be provided in the transmission area and include only a transparent light emitting device.

The transmission area includes a light emitting area in which the transparent pixel is provided and a non-light emitting area in which a light emitting device is not provided.

The transparent light emitting device includes a transparent anode and a transparent cathode.

The transparent anode is connected to an anode line provided in parallel with a data line provided on the substrate, and the transparent cathode is connected to a cathode line provided on the substrate.

The first light emitting device includes a first anode and a common cathode, the second light emitting device includes a second anode and the common cathode, the transparent light emitting device includes a transparent anode and a transparent cathode, and the common cathode and the transparent cathode are separated from each other.

The substrate is provided with a common cathode line connected to the common cathode and a cathode line connected to the transparent cathode.

The substrate is provided with a data line for supplying a data voltage to the first pixel driving circuit, the substrate is provided with a gate line for supplying a gate signal to the first pixel driving circuit, the common cathode line is provided in parallel with the data line, and the cathode line is provided in parallel with the gate line.

The substrate is provided with a data line for supplying a data voltage to the first pixel driving circuit, the substrate is provided with a gate line for supplying a gate signal to the first pixel driving circuit, and the first color pixel, the second color pixel, and the transparent pixel are provided in a row along the data line.

The substrate is provided with an anode line connected to a transparent anode provided in the transparent pixel, and the anode line is provided on the substrate in parallel with the data line.

The substrate is further provided with another data line for supplying a data voltage to the second pixel driving circuit, and the gate line connected to the first pixel driving circuit is connected to the second pixel driving circuit.

The substrate is further provided with another gate line connected to the second pixel driving circuit, and the data line is connected to the second pixel driving circuit.

The transparent pixel is not provided with a pixel driving circuit.

The substrate is provided with a data line for supplying a data voltage to the first pixel driving circuit, first color pixels, second color pixels, and transparent pixels are provided along the data line, transparent light emitting devices configuring the transparent pixels include transparent anodes and transparent cathodes, and the transparent pixels are divided into a first group and a second group along the data line.

The substrate is provided with a first group anode line connected to transparent anodes included in the first group and a second group anode line connected to transparent anodes included in the second group, and the first group anode line and the second group anode line are provided along the data line and are adjacent to each other.

The substrate is divided into a display area provided with the first color pixels, the second color pixels, and the transparent pixels, and a non-display area surrounding the display area, the display area is provided with cathode lines connected to the transparent cathodes along a direction different from a direction in which the data line is provided, and the non-display area is provided with a first group cathode line connected to cathode lines included in the first group and a second group cathode line connected to cathode lines included in the second group.

A cathode voltage is sequentially supplied to the first group cathode line and the second group cathode line.

When a cathode voltage is supplied to the first group cathode line, an anode voltage is supplied to the first group anode line, and when a cathode voltage is supplied to the second group cathode line, an anode voltage is supplied to the second group anode line.

When the cathode lines are divided into the first group cathode line to an nth group cathode line (n is a natural number smaller than the number of cathode lines), a cathode voltage is supplied to each of the first group cathode line to the nth group cathode line for 1/n period of one frame period.

The light emitting display apparatus further comprises a gate driver configured to supply a gate signal to the first pixel driving circuit and a cathode driver configured to sequentially supply cathode voltage to the cathode lines.

Transparent pixels included in the first group simultaneously output light, and transparent pixels included in the second group simultaneously output light.

The light emitting display apparatus according to the present disclosure can be applied to all electronic devices including a light emitting display panel. For example, the light emitting display apparatus according to the present disclosure can be applied to a virtual reality (VR) device, an augmented reality (AR) device, a mobile device, a video phone, a smart watch, a watch phone, or a wearable device. device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

According to a light emitting display apparatus according to an embodiment of the present disclosure, because some of the pixels outputting light can transmit light flowing in from the outside, the transmittance of the light emitting display apparatus can be improved.

According to a light emitting display apparatus according to an embodiment of the present disclosure, the pixels capable of transmitting light can be divided into groups, and the output of light can be controlled for each group. Accordingly, a period during which light is output from pixels capable of transmitting light can be increased, thereby preventing the quality of the image output from the light emitting display apparatus from being degraded.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:

a substrate divided into a transmission area through which light is transmitted and a non-transmission area through which light is blocked;

a first color pixel in the non-transmission area, the first color pixel including a first pixel driving circuit and a first light emitting device that is electrically connected to the first pixel driving circuit;

a second color pixel in the non-transmission area, the second color pixel include a second pixel driving circuit and a second light emitting device that is electrically connected to the second pixel driving circuit; and a transparent pixel in the transmission area, the transparent pixel including a transparent light emitting device that emits light without being electrically connected to a pixel driving circuit.

2. The light emitting display apparatus of claim 1, wherein the transmission area includes a light emitting area in which the transparent pixel is disposed and a non-light emitting area that lacks any light emitting devices.

3. The light emitting display apparatus of claim 1, wherein the transparent light emitting device includes a transparent anode and a transparent cathode.

4. The light emitting display apparatus of claim 3, further comprising:

a data line on the substrate;

an anode line on the substrate that is connected to the transparent anode, the anode line in parallel with the data line, and a cathode line on the substrate, the cathode line connected to the transparent cathode.

5. The light emitting display apparatus of claim 1, wherein the first light emitting device includes a first anode and a common cathode, the second light emitting device includes a second anode and the common cathode that is included in the first light emitting device, and the transparent light emitting device includes a transparent anode and a transparent cathode that is separated from the common cathode.

6. The light emitting display apparatus of claim 5, further comprising:

a common cathode line on the substrate, the common cathode line connected to the common cathode; and a cathode line connected to the transparent cathode.

7. The light emitting display apparatus of claim 6, further comprising:

a data line on the substrate, the data line supplying a data voltage to the first pixel driving circuit, a gate line on the substrate, the gate line supplying a gate signal to the first pixel driving circuit, wherein the common cathode line is parallel with the data line, and the cathode line is parallel with the gate line.

8. The light emitting display apparatus of claim 1, further comprising:

a first data line on the substrate, the first data line supplying a data voltage to the first pixel driving circuit, a first gate line on the substrate, the first gate line supplying a gate signal to the first pixel driving circuit, and wherein the first color pixel, the second color pixel, and the transparent pixel are arranged in a column along the first data line.

9. The light emitting display apparatus of claim 8, further comprising:

an anode line on the substrate, the anode line connected to a transparent anode that is included in the transparent pixel and the anode line parallel with the first data line.

10. The light emitting display apparatus of claim 8, further comprising:

a second data line that supplies a data voltage to the second pixel driving circuit, wherein the first gate line that is connected to the first pixel driving circuit is connected to the second pixel driving circuit.

11. The light emitting display apparatus of claim 8, further comprising:

a second gate line connected to the second pixel driving circuit, wherein the first data line is connected to the second pixel driving circuit.

12. The light emitting display apparatus of claim 1, further comprising:

a data line that supplies a data voltage to the first pixel driving circuit, first color pixels including the first color pixel, second color pixels including the second color pixel, and transparent pixels including the transparent pixel that are arranged along the data line, transparent light emitting devices included in the transparent pixels, the transparent light emitting devices including transparent anodes and transparent cathodes, and wherein the transparent pixels include a first group and a second group that are arranged along the data line.

13. The light emitting display apparatus of claim 12, further comprising:

a first group anode line on the substrate, the first group anode line connected to a first subset of the transparent anodes included in the first group; and a second group anode line on the substrate, the second group anode line connected to a second subset of the transparent anodes included in the second group, wherein the first group anode line and the second group anode line are arranged along the data line and are adjacent to each other.

14. The light emitting display apparatus of claim 13, wherein the substrate is divided into a display area and a non-display area surrounding the display area, the display area including the first color pixels, the second color pixels, and the transparent pixels, the light emitting display apparatus further comprising:

cathode lines in the display area, the cathode lines connected to the transparent cathodes along a direction different from a direction in which the data line extends, and a first group cathode line in the non-display area, the first group cathode line connected to a first subset of the cathode lines included in the first group; and a second group cathode line in the non-display area, the second group cathode line connected to a second subset of the cathode lines included in the second group.

15. The light emitting display apparatus of claim 14, wherein a cathode voltage is sequentially supplied to the first group cathode line and the second group cathode line.

16. The light emitting display apparatus of claim 15, wherein responsive to a first cathode voltage being supplied to the first group cathode line, a first anode voltage is supplied to the first group anode line, and responsive to a second cathode voltage is supplied to the second group cathode line, a second anode voltage is supplied to the second group anode line.

17. The light emitting display apparatus of claim 15, wherein the cathode lines are divided into the first group cathode line to an nth group cathode line (n is a natural number smaller than a number of cathode lines), and a cathode voltage is supplied to each of the first group cathode line to the nth group cathode line for 1/n period of one frame period.

18. The light emitting display apparatus of claim 15, further comprising:

a gate driver configured to supply a gate signal to the first pixel driving circuit; and a cathode driver configured to sequentially supply the cathode voltage to the cathode lines.

19. The light emitting display apparatus of claim 12, wherein a first subset of the transparent pixels that are included in the first group simultaneously output light, and a second subset of the transparent pixels that are included in the second group simultaneously output light.

20. A display device comprising:

a substrate including a transmission area and a non-transmission area that is less transmissive of external light than the transmission area;

a first pixel in the non-transmission area that is configured to emit light, the first pixel including a first light emitting device and a first transistor that is electrically connected to the first light emitting device; and a second pixel in the transmission area that is configured to emit light, the second pixel including a transparent light emitting device that is directly connected to an anode line that supplies an anode voltage corresponding to image data of the second pixel to the transparent light emitting device, wherein the first transistor is included in a first pixel driving circuit, and wherein the transparent light emitting device is not electrically connected to a pixel driving circuit including a transistor.

21. The display device of claim 20, wherein the transparent light emitting device comprising:

a transparent anode that is directly connected to the anode line;

a transparent light emitting layer on the transparent anode; and a transparent cathode on the transparent light emitting layer.

22. The display device of claim 21, wherein the first light emitting device comprising:

a first anode that is connected to the first transistor;

a first light emitting layer on the first anode; and a cathode on the first light emitting layer.

23. The display device of claim 22, wherein the first anode is opaque and the cathode is transparent.

24. The display device of claim 22, further comprising:

a data line on the substrate, the data line supplying a data voltage to the first pixel;

a gate line on the substrate, the gate line supplying a scan signal to the first pixel;

a cathode line on the substrate, the cathode line supplying a cathode voltage to the transparent cathode; and a common cathode line on the substrate, the common cathode line supplying a common voltage to the cathode, wherein the anode line and the common cathode line are parallel to the data line in a plan view of the display device and the cathode line is parallel to the gate line in the plan view.

25. The display device of claim 22, further comprising:

a third pixel in the non-transmission area that is configured to emit light, the third pixel including a third light emitting device and a second transistor that is electrically connected to the third light emitting device.

26. The display device of claim 25, wherein the third light emitting device comprises:

a second anode that is connected to the second transistor;

a second light emitting layer on the first anode; and the cathode on the second light emitting layer that is also on the first light emitting layer, wherein the cathode is separated from the transparent cathode.

* * * * *